(12) United States Patent
Kim

(10) Patent No.: US 12,194,968 B2
(45) Date of Patent: Jan. 14, 2025

(54) ELECTRONIC BRAKE SYSTEM AND OPERATION METHOD

(71) Applicant: HL MANDO CORPORATION, Gyeonggi-do (KR)

(72) Inventor: Jin Seok Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 669 days.

(21) Appl. No.: 17/437,054

(22) PCT Filed: Mar. 12, 2020

(86) PCT No.: PCT/KR2020/003470
§ 371 (c)(1),
(2) Date: Sep. 8, 2021

(87) PCT Pub. No.: WO2020/185012
PCT Pub. Date: Sep. 17, 2020

(65) Prior Publication Data
US 2022/0176931 A1   Jun. 9, 2022

(30) Foreign Application Priority Data
Mar. 12, 2019   (KR) .................. 10-2019-0028335

(51) Int. Cl.
*B60T 8/36*   (2006.01)
*B60T 8/32*   (2006.01)
(Continued)

(52) U.S. Cl.
CPC ............ *B60T 13/686* (2013.01); *B60T 8/326* (2013.01); *B60T 8/885* (2013.01); *B60T 13/142* (2013.01);
(Continued)

(58) Field of Classification Search
CPC ........ B60T 7/042; B60T 8/326; B60T 8/4081; B60T 8/885; B60T 13/142;
(Continued)

(56) References Cited

U.S. PATENT DOCUMENTS

2007/0170774 A1   7/2007   Gerum et al.
2016/0031426 A1   2/2016   Feigel et al.
(Continued)

FOREIGN PATENT DOCUMENTS

CN   102235450   11/2011
CN   102582601   7/2012
(Continued)

OTHER PUBLICATIONS

Office Action dated Jul. 31, 2023 for Korean Patent Application No. 10-2019-0028335 and its English translation from Global Dossier.
(Continued)

*Primary Examiner* — Nicholas J Lane
(74) *Attorney, Agent, or Firm* — Womble Bond Dickinson (US) LLP

(57) ABSTRACT

The present disclosure relates to an electronic brake system and an operation method thereof. The electronic brake system includes a reservoir in which a fluid is stored, a hydraulic pressure supply device configured to generate a hydraulic pressure by operating a hydraulic piston in response to a signal from a pedal displacement sensor detecting a displacement of a brake pedal, a hydraulic control unit including a first hydraulic unit configured to control the hydraulic pressure to be transferred from the hydraulic pressure supply device to a first hydraulic circuit including two wheel cylinders, and a second hydraulic unit configured to control the hydraulic pressure to be transferred from the hydraulic pressure supply device to a second hydraulic circuit including other two wheel cylinders.

19 Claims, 19 Drawing Sheets

(51) Int. Cl.
*B60T 8/88* (2006.01)
*B60T 13/14* (2006.01)
*B60T 13/68* (2006.01)
*B60T 7/04* (2006.01)
*B60T 8/40* (2006.01)

(52) U.S. Cl.
CPC ............ *B60T 13/148* (2013.01); *B60T 7/042* (2013.01); *B60T 8/4081* (2013.01); *B60T 2220/04* (2013.01); *B60T 2270/402* (2013.01); *B60T 2270/404* (2013.01); *B60T 2270/82* (2013.01)

(58) Field of Classification Search
CPC ............... B60T 13/1478; B60T 13/686; B60T 2220/04; B60T 2270/40; B60T 2270/82
See application file for complete search history.

(56) References Cited

U.S. PATENT DOCUMENTS

| | | | | |
|---|---|---|---|---|
| 2017/0144642 | A1* | 5/2017 | Kim | B60T 13/745 |
| 2017/0210369 | A1* | 7/2017 | Lim | B60T 13/04 |
| 2017/0282877 | A1 | 10/2017 | Besier et al. | |
| 2018/0111593 | A1* | 4/2018 | Kim | B60T 8/88 |
| 2018/0334148 | A1* | 11/2018 | Feigel | B60T 13/662 |
| 2019/0031165 | A1* | 1/2019 | Besier | B60T 8/348 |
| 2019/0092300 | A1* | 3/2019 | Jeong | B60T 13/686 |
| 2019/0092301 | A1* | 3/2019 | Jeong | B60T 8/4081 |
| 2019/0100183 | A1* | 4/2019 | Jung | B60T 7/042 |
| 2019/0100185 | A1* | 4/2019 | Jeong | B60T 13/662 |
| 2020/0307538 | A1* | 10/2020 | Ganzel | B60T 8/4081 |
| 2021/0053540 | A1* | 2/2021 | Besier | B60T 13/58 |
| 2022/0041149 | A1* | 2/2022 | Tarandek | B60T 7/042 |
| 2022/0227340 | A1* | 7/2022 | Kim | H02K 11/21 |
| 2023/0391305 | A1* | 12/2023 | Kim | B60T 13/662 |

FOREIGN PATENT DOCUMENTS

| | | |
|---|---|---|
| CN | 107985289 | 5/2018 |
| CN | 108944878 | 12/2018 |
| CN | 108944883 | 12/2018 |
| DE | 10 2005 030 223 | 1/2007 |
| DE | 10 2017 206 508 | 10/2017 |
| DE | 10 2017 222 445 | 7/2018 |
| DE | 10 2018 207 771 | 2/2019 |
| EP | 1142766 | 10/2001 |
| JP | 1159349 | 3/1999 |
| JP | 2008265450 | 11/2008 |
| KR | 10-2009-0121921 | 11/2009 |
| KR | 10-2011-0036109 | 4/2011 |
| KR | 10-2012-0048910 | 5/2012 |
| KR | 10-2015-0138295 | 12/2015 |
| KR | 10-2018-0126288 | 11/2018 |
| KR | 10-2019-0023827 | 3/2019 |
| WO | 2017/017491 | 2/2017 |

OTHER PUBLICATIONS

Office Action dated Sep. 13, 2023 for Chinese Patent Application No. 202080020499.6 and its English machine translation by Google Translate.

International Search Report for PCT/KR2020/003470 mailed on Jul. 9, 2020 (now published as WO 2020/185012) with English translation provided by the WIPO.

Written Opinion of the International Searching Authority for PCT/KR2020/003470 mailed on Jul. 9, 2020 (now published as WO 2020/185012) with English translation provided by Google Translate.

Office Action dated Jun. 17, 2024 for German Patent Application No. 11 2020 001 162.3 and its English translation provided by Applicant's foreign counsel.

* cited by examiner

[Fig. 1]
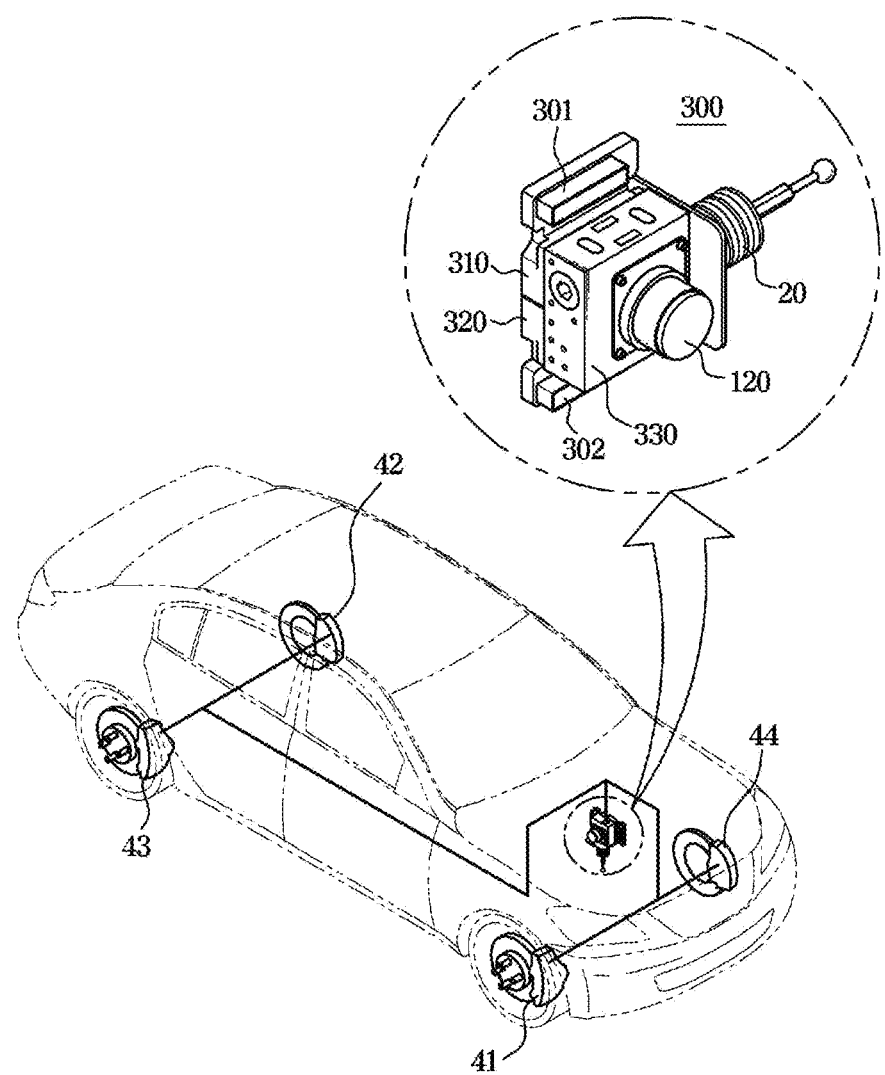

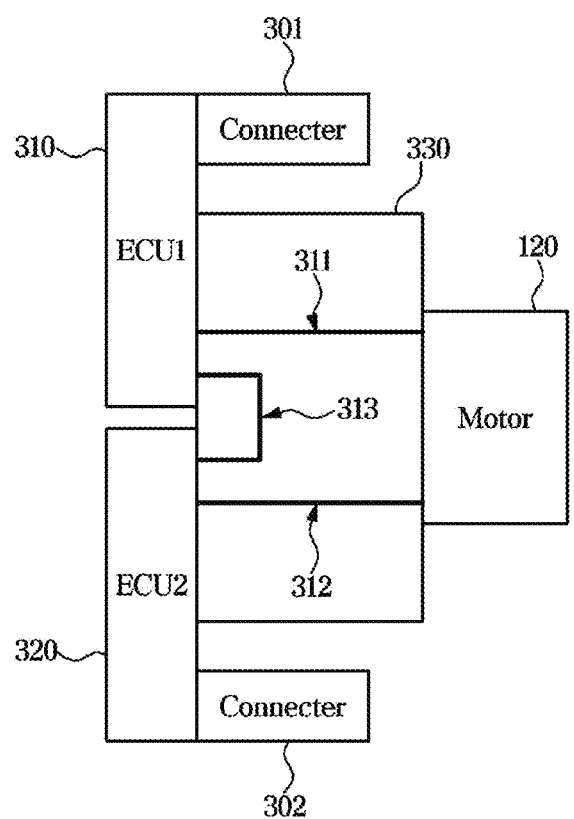
[Fig. 2]

[Fig. 3]
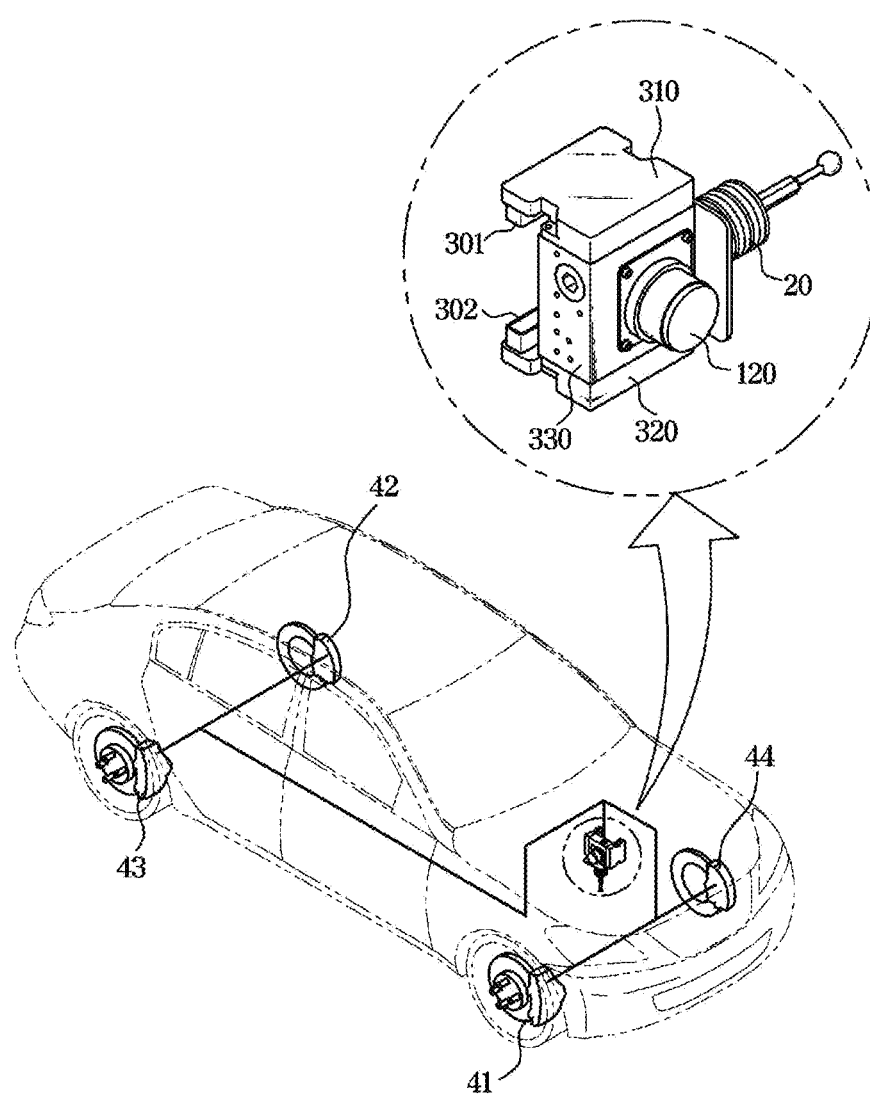

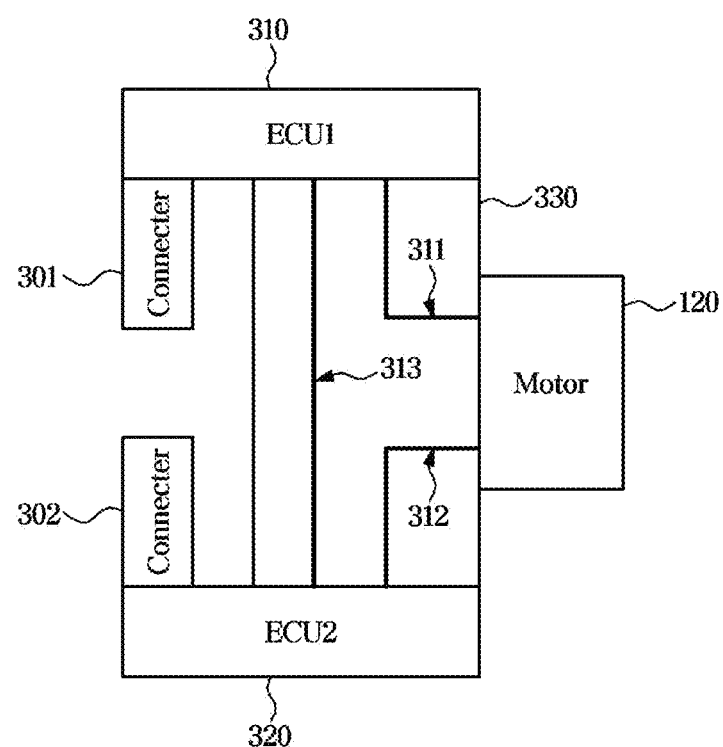
[Fig. 4]

[Fig. 5]
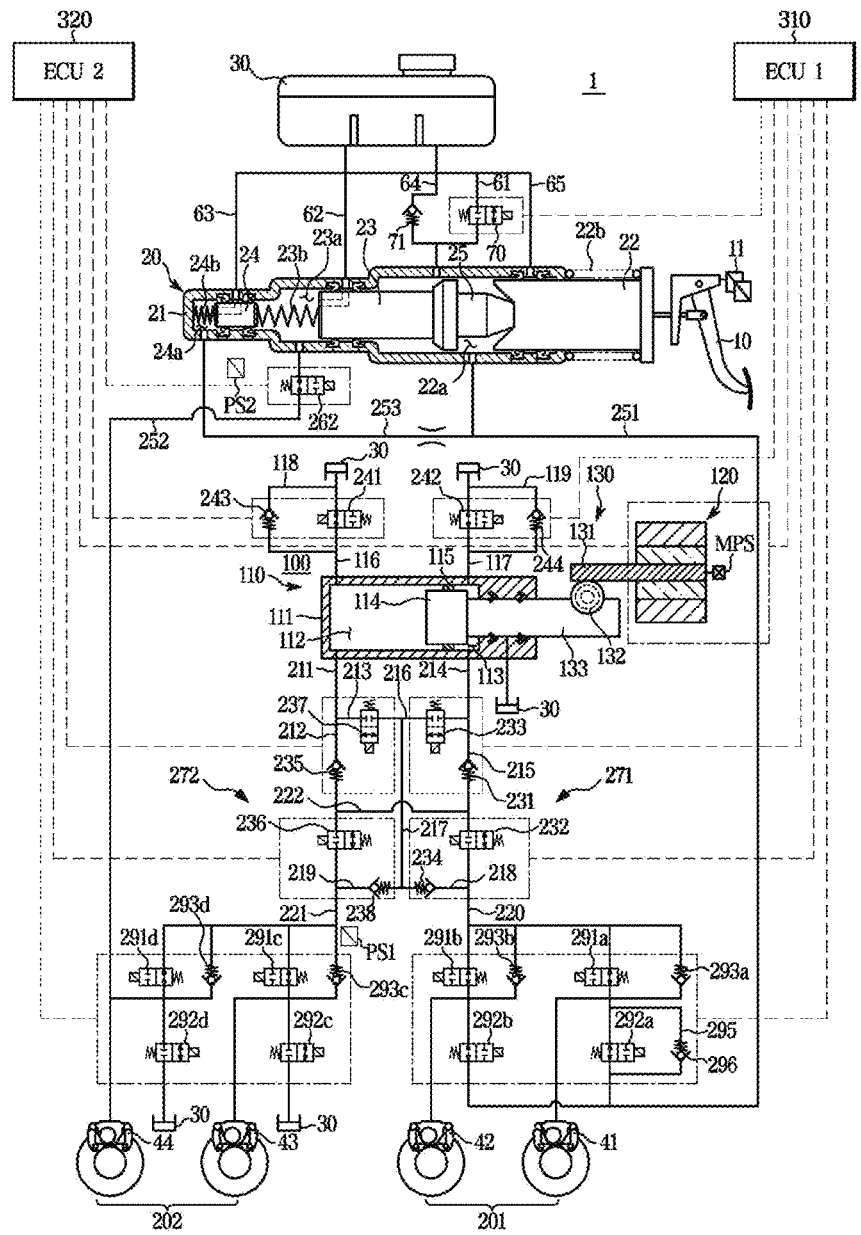

[Fig. 6]
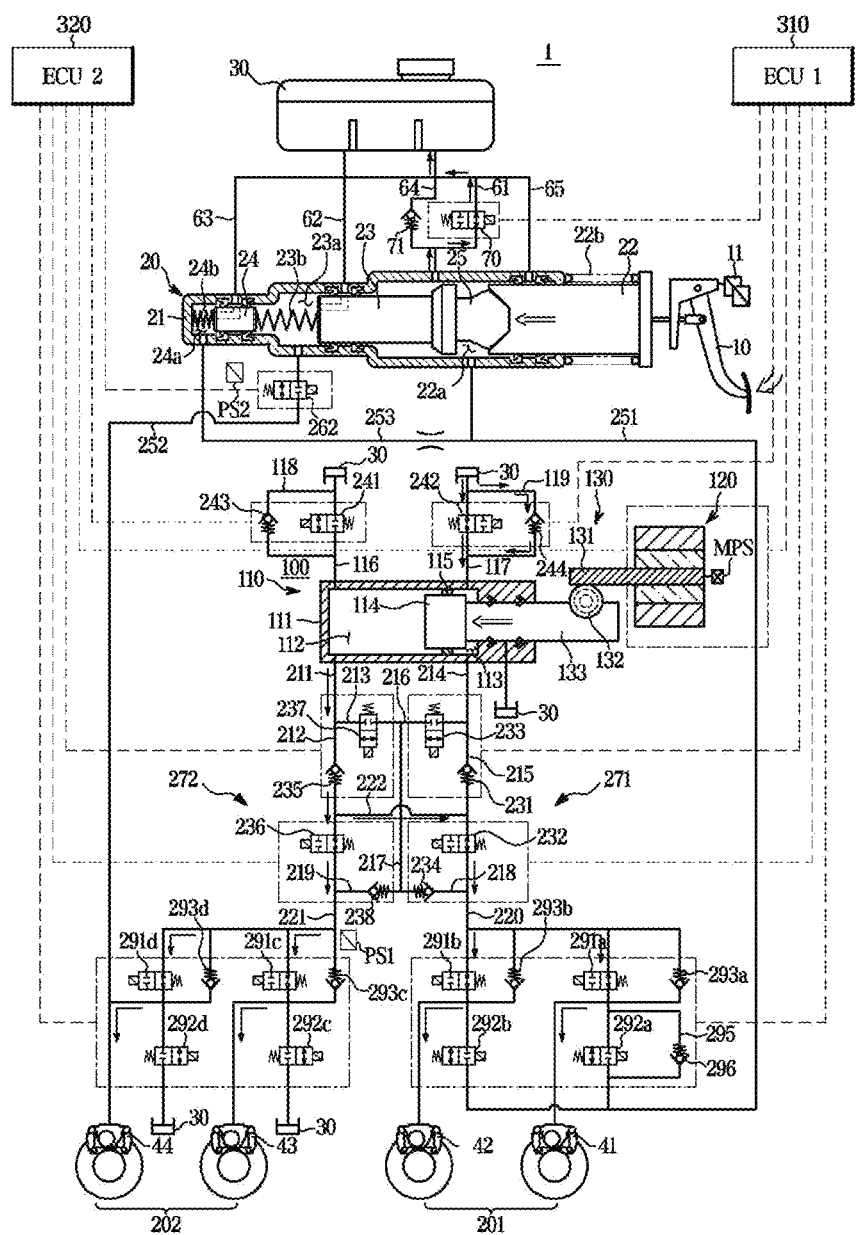

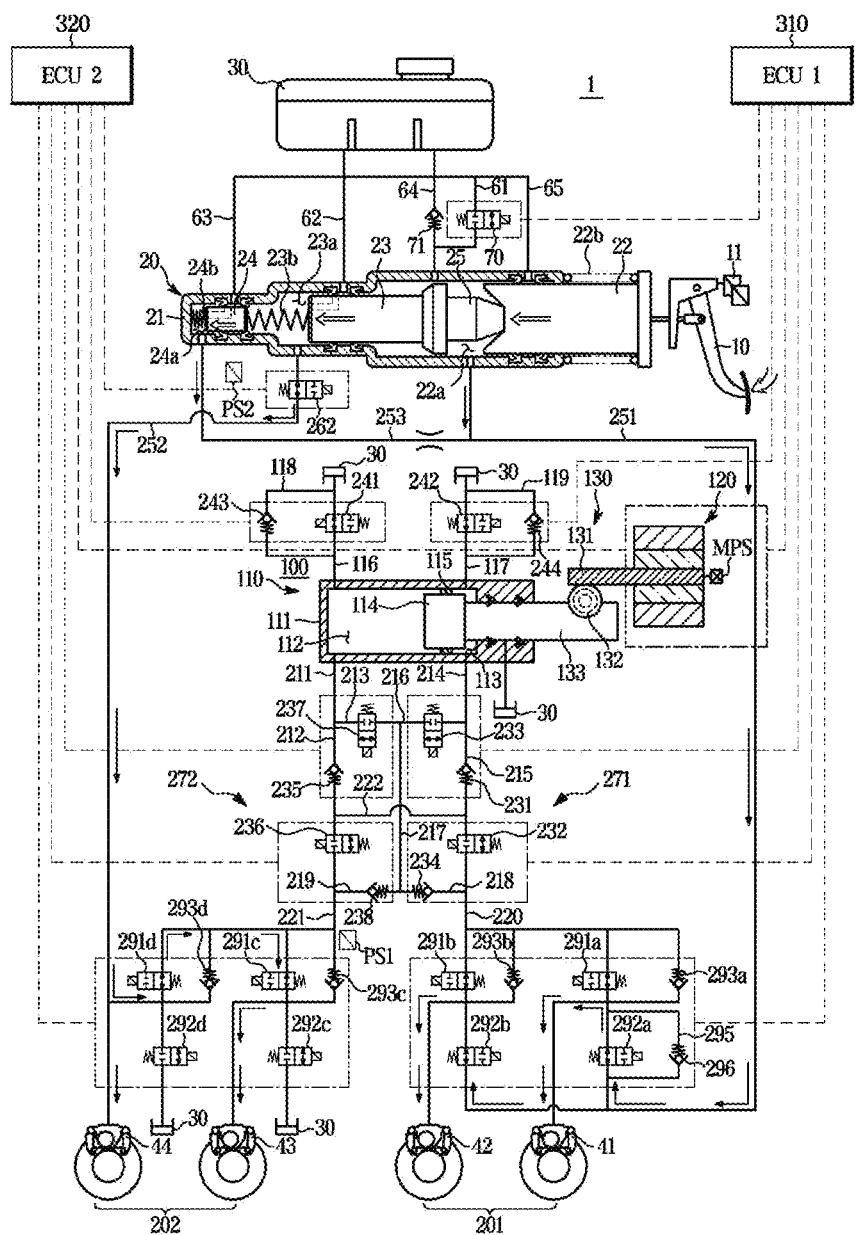
[Fig. 7]

【Fig. 8】
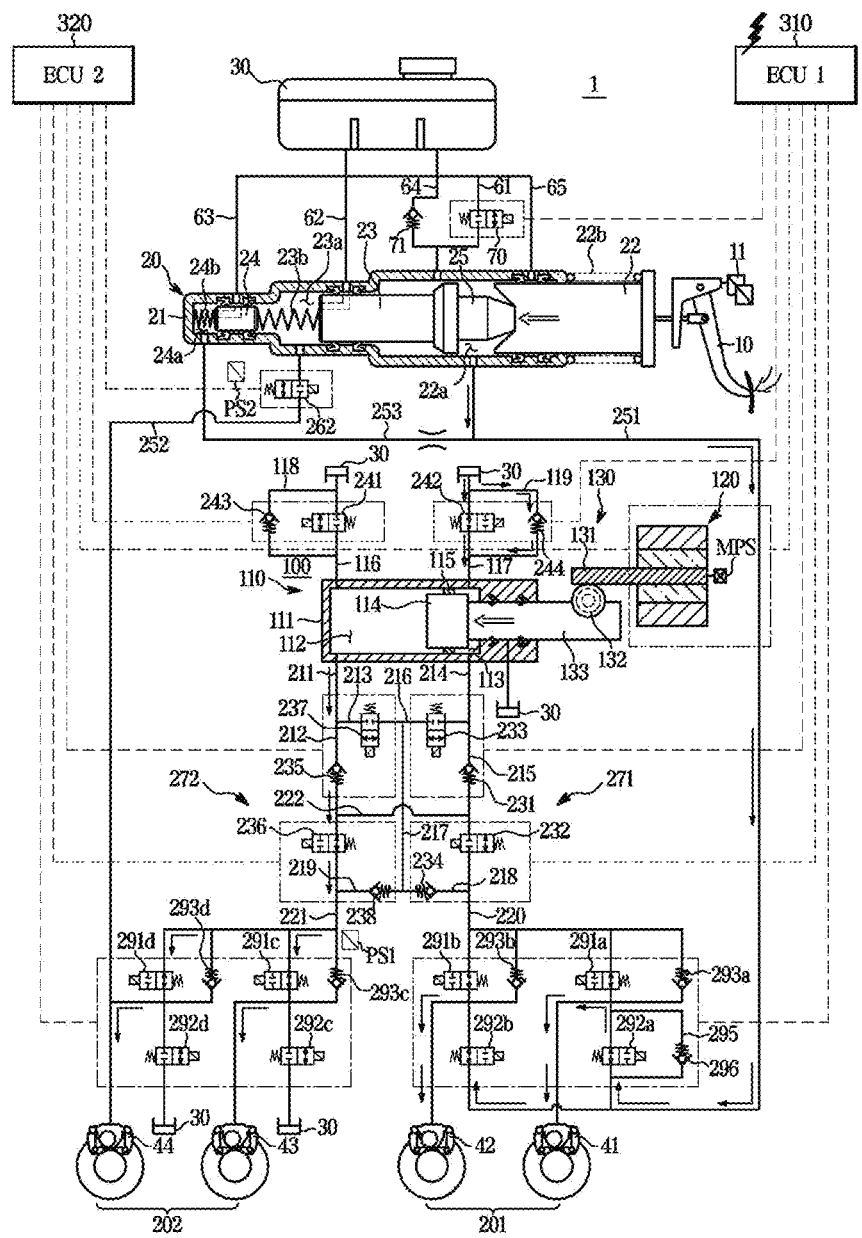

[Fig. 9]
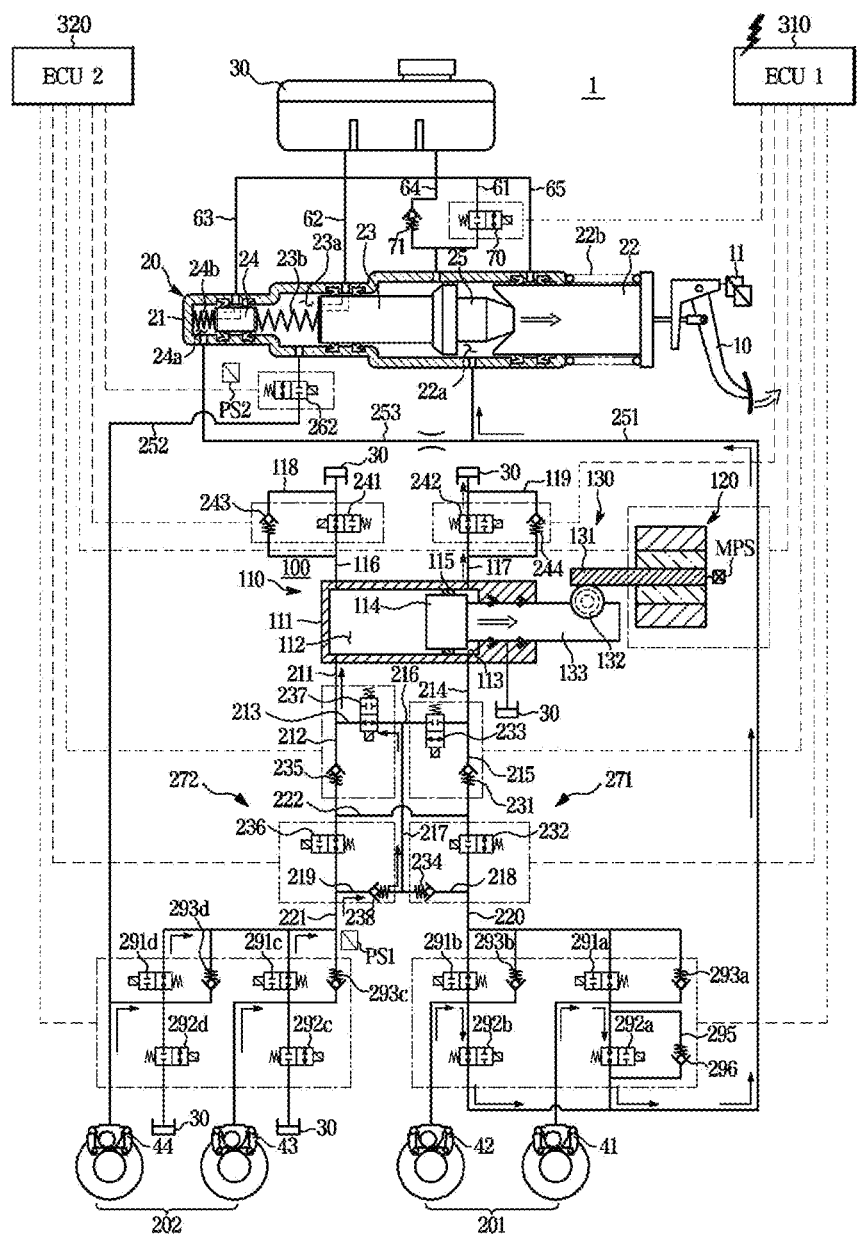

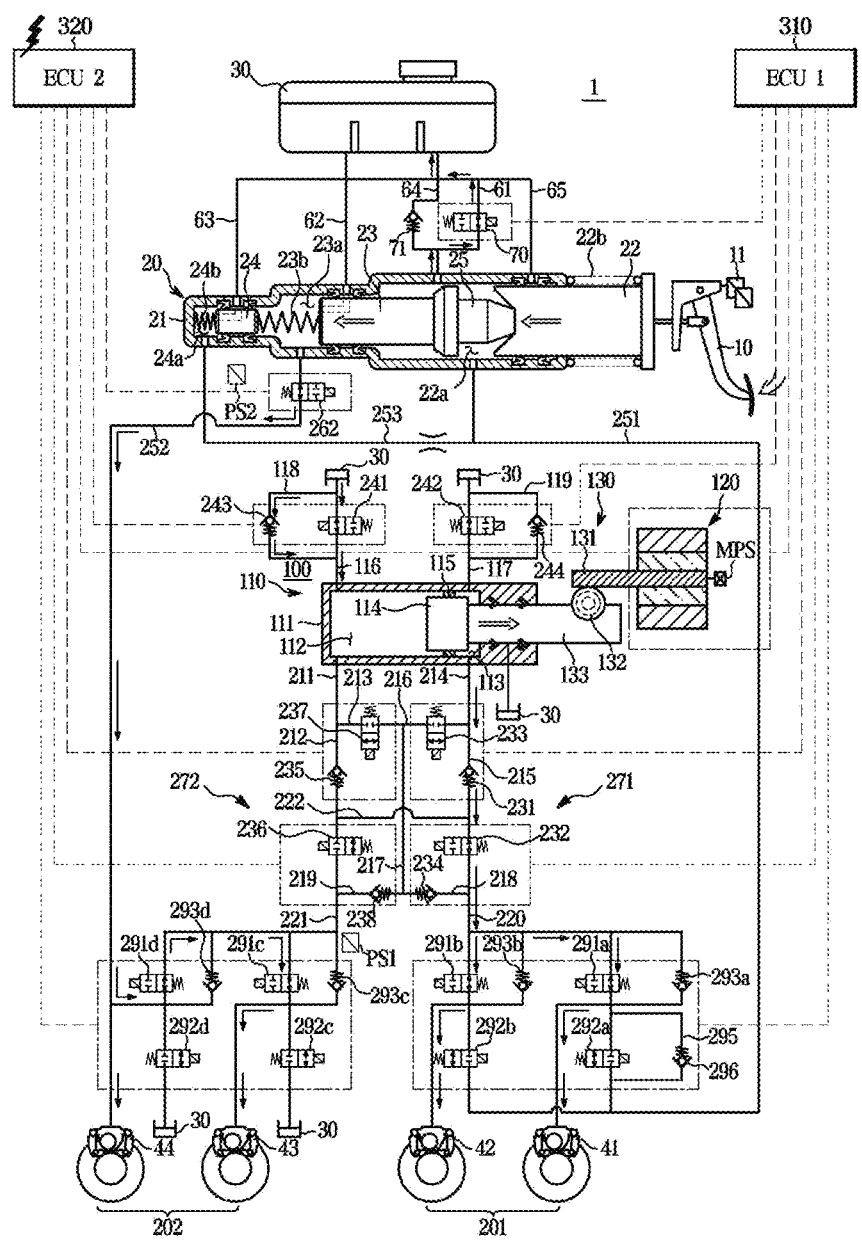
[Fig. 10]

[Fig. 11]
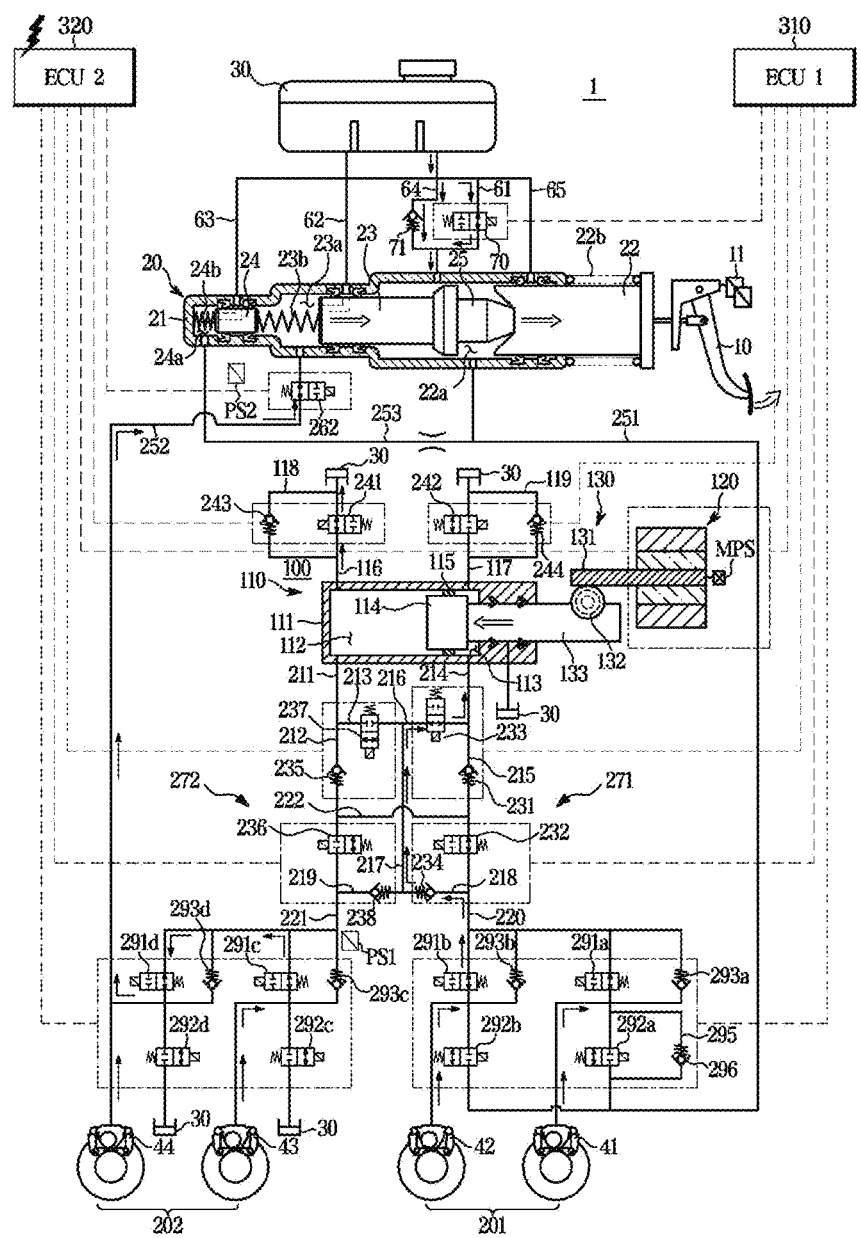

[Fig. 12]
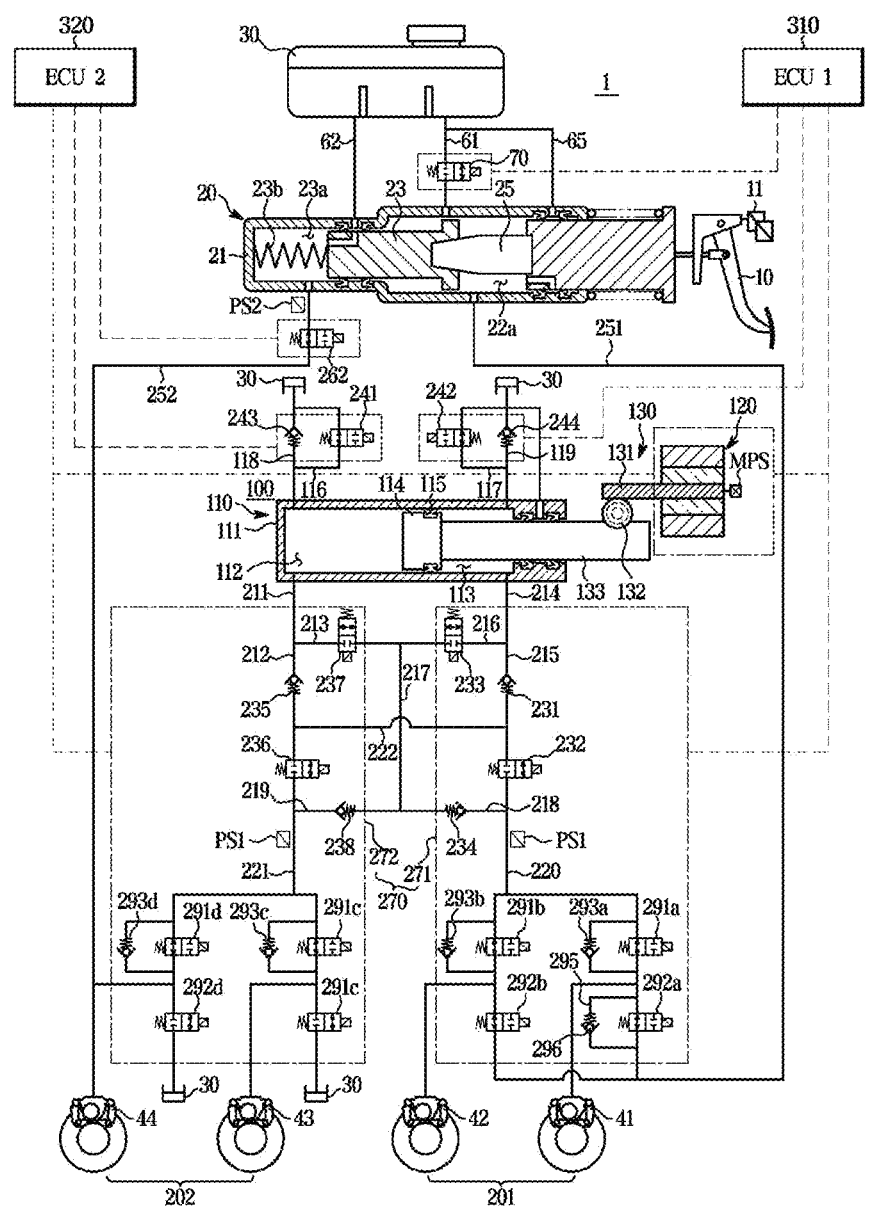

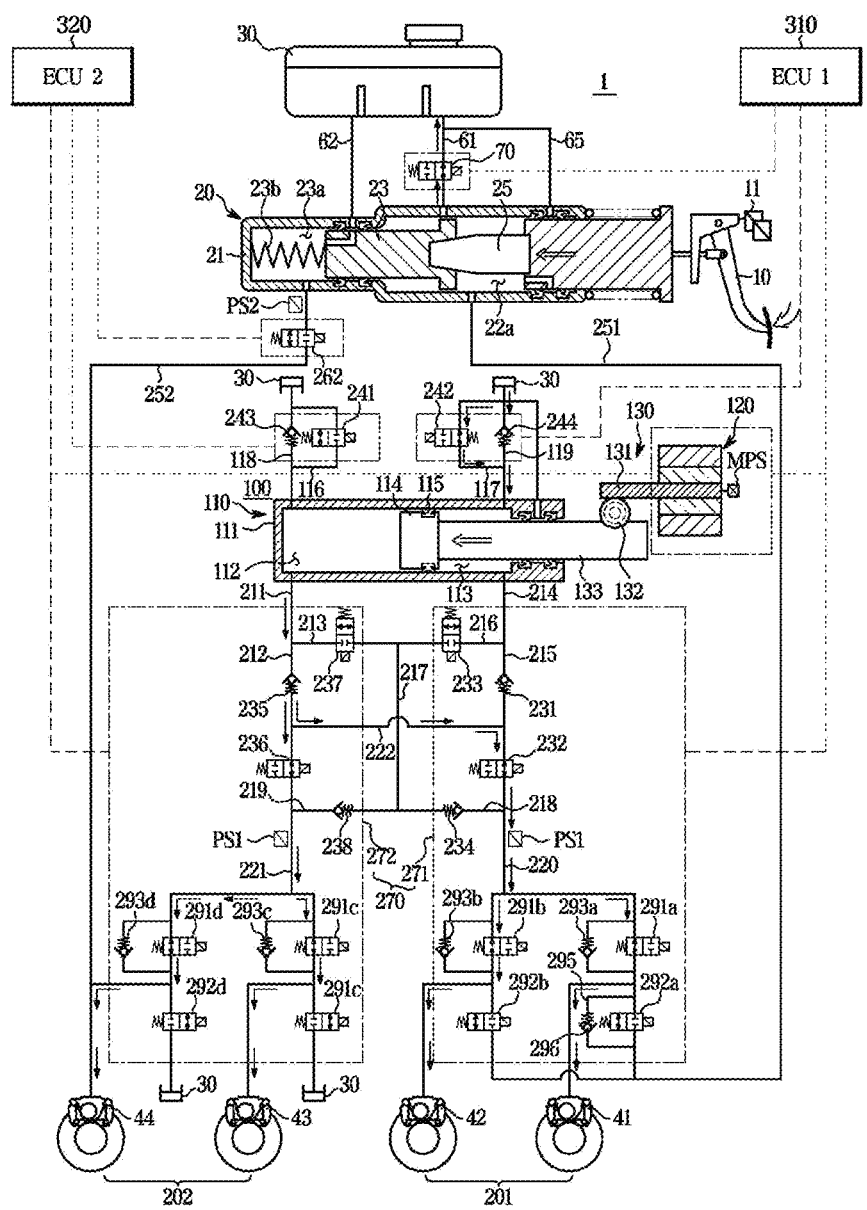
[Fig. 13]

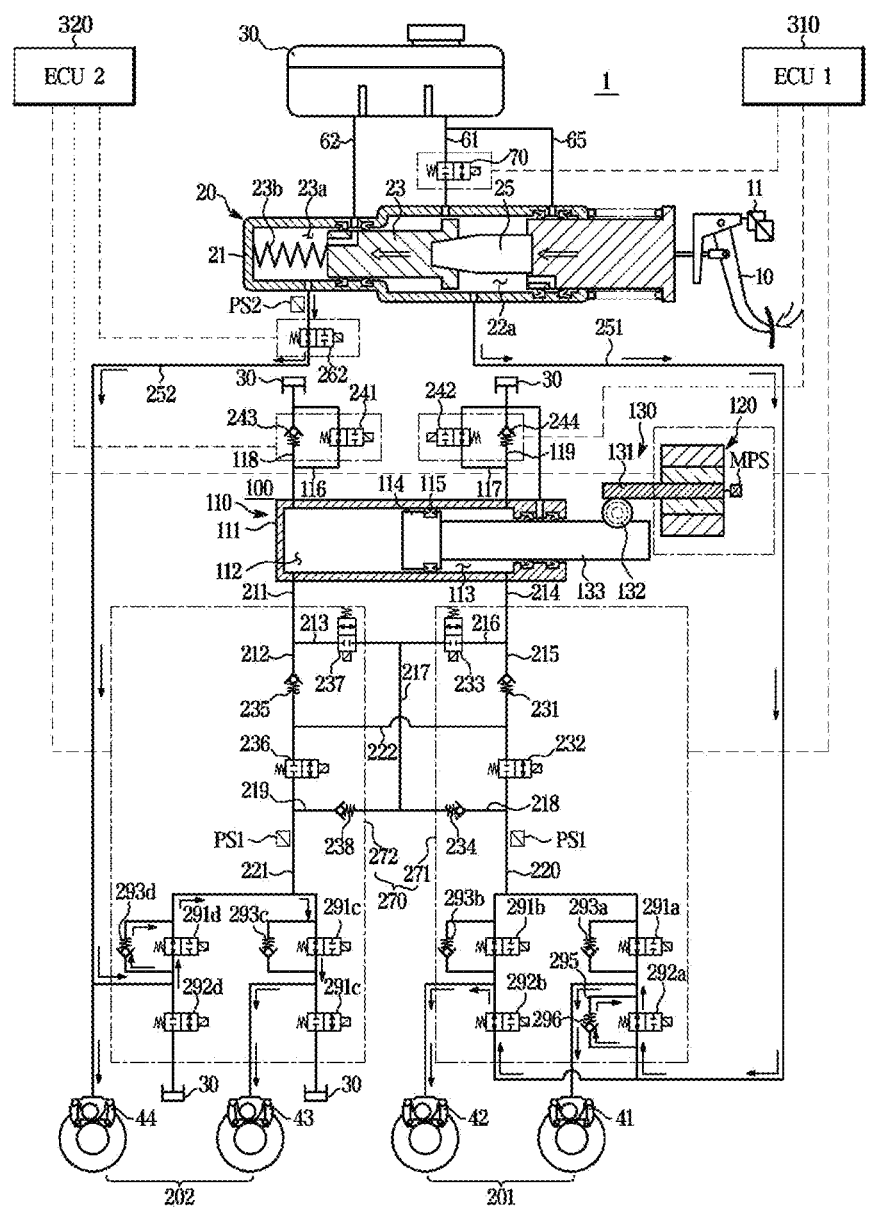
[Fig. 14]

[Fig. 15]
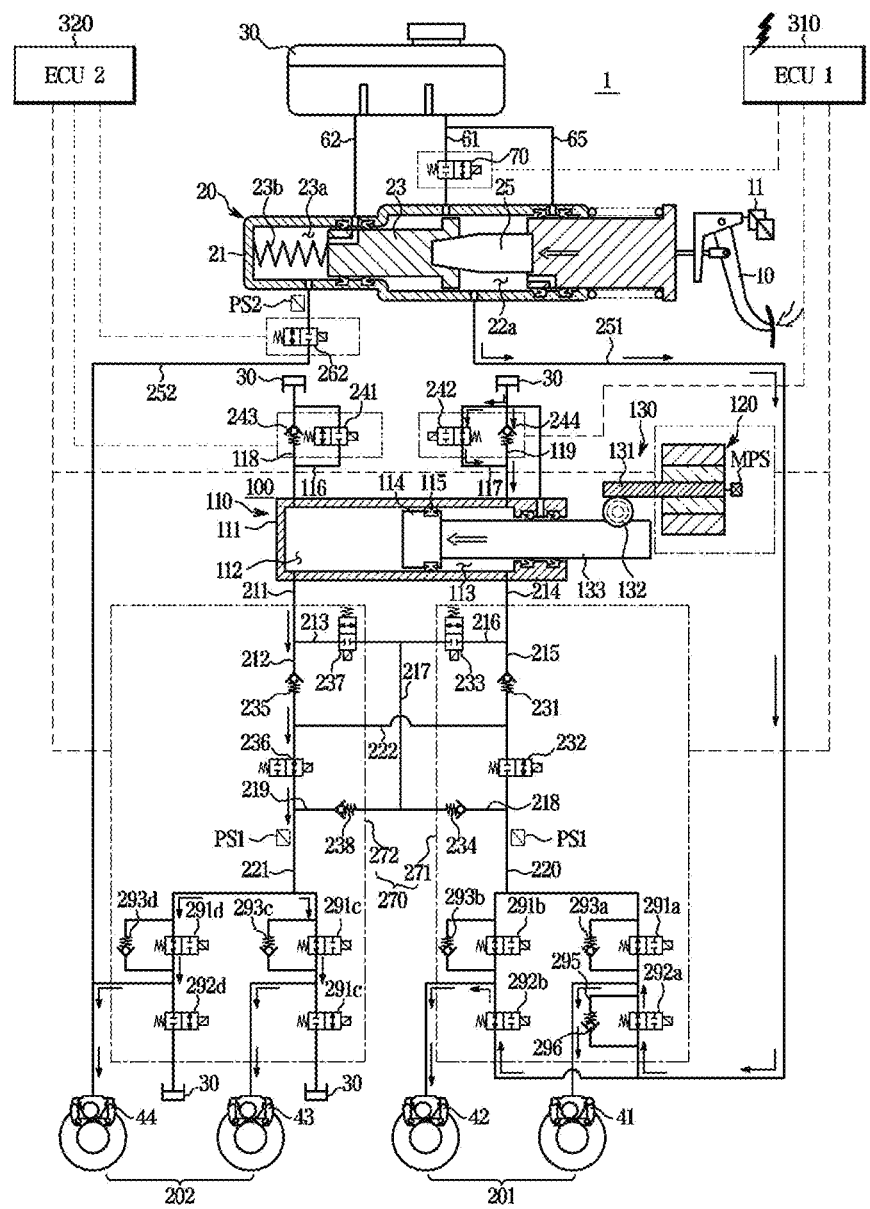

[Fig. 16]
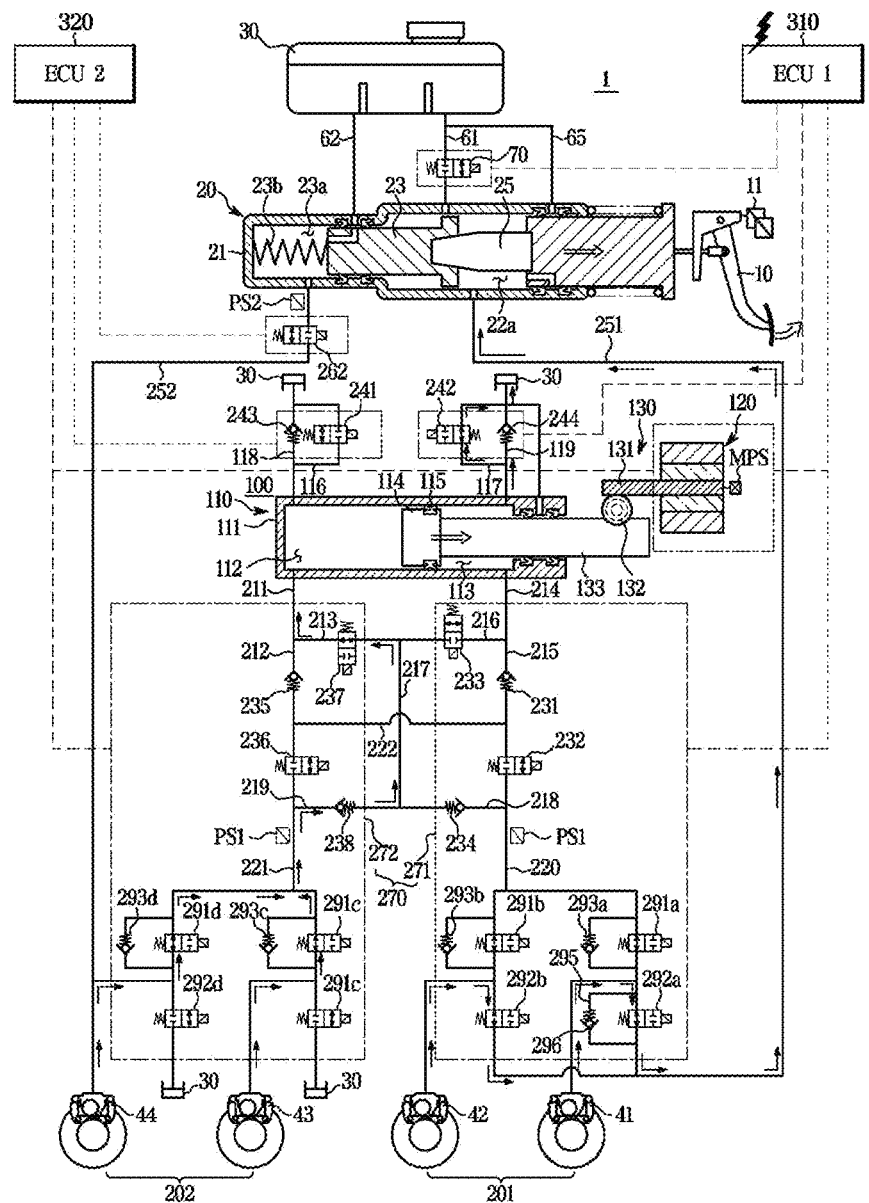

[Fig. 17]
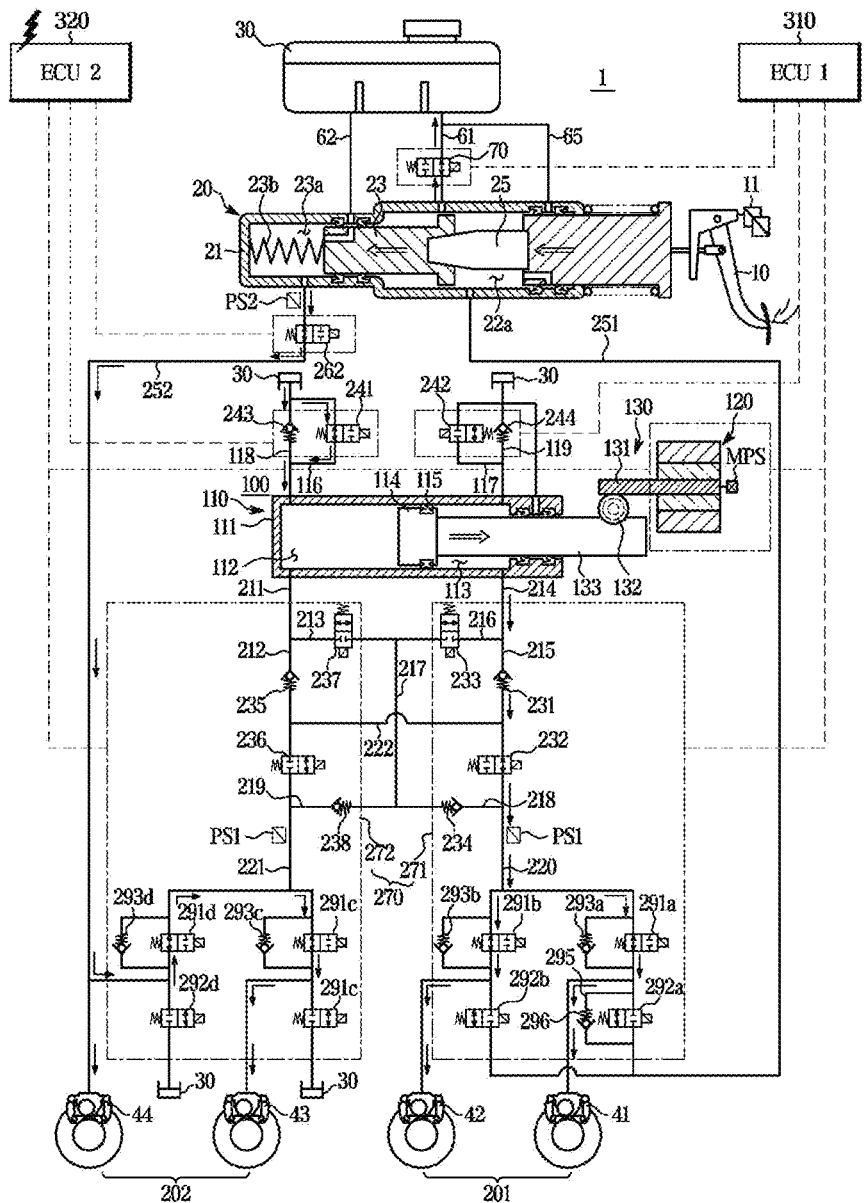

[Fig. 18]
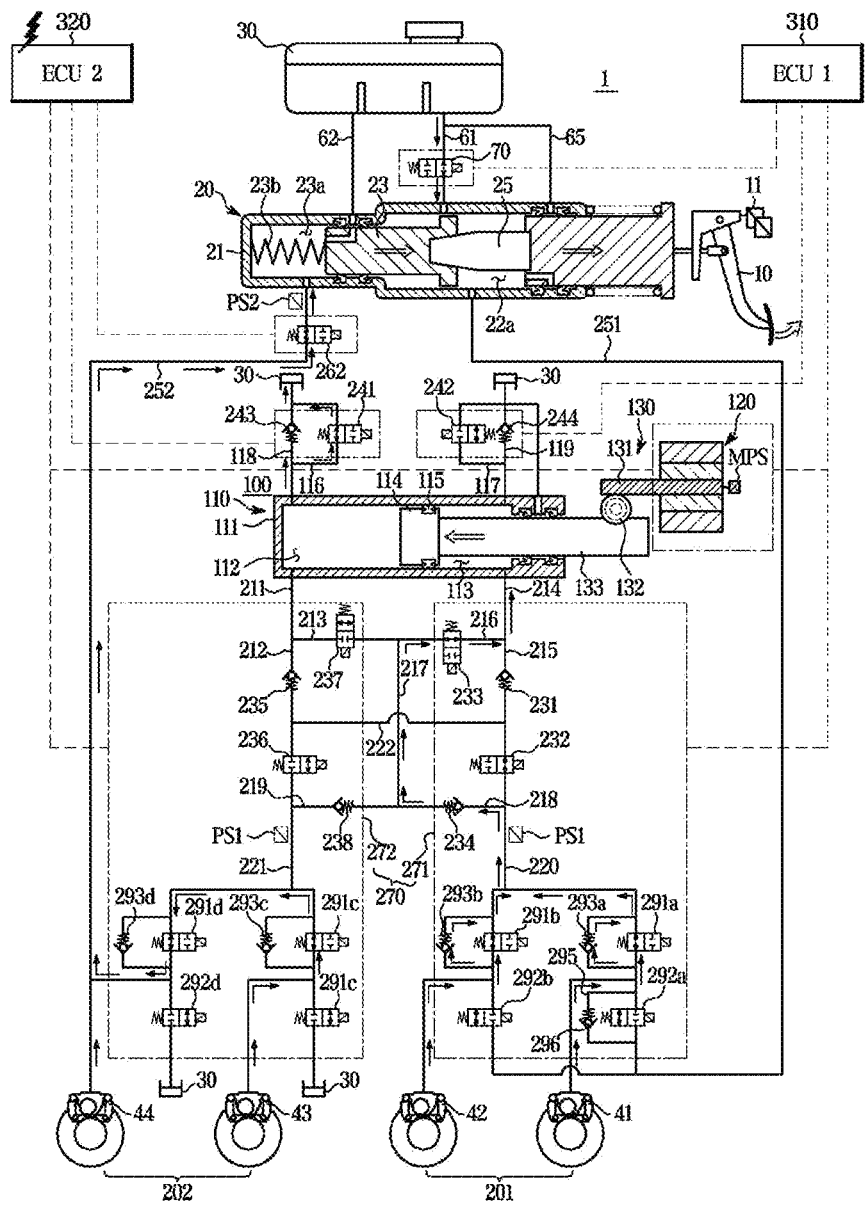

[Fig. 19]
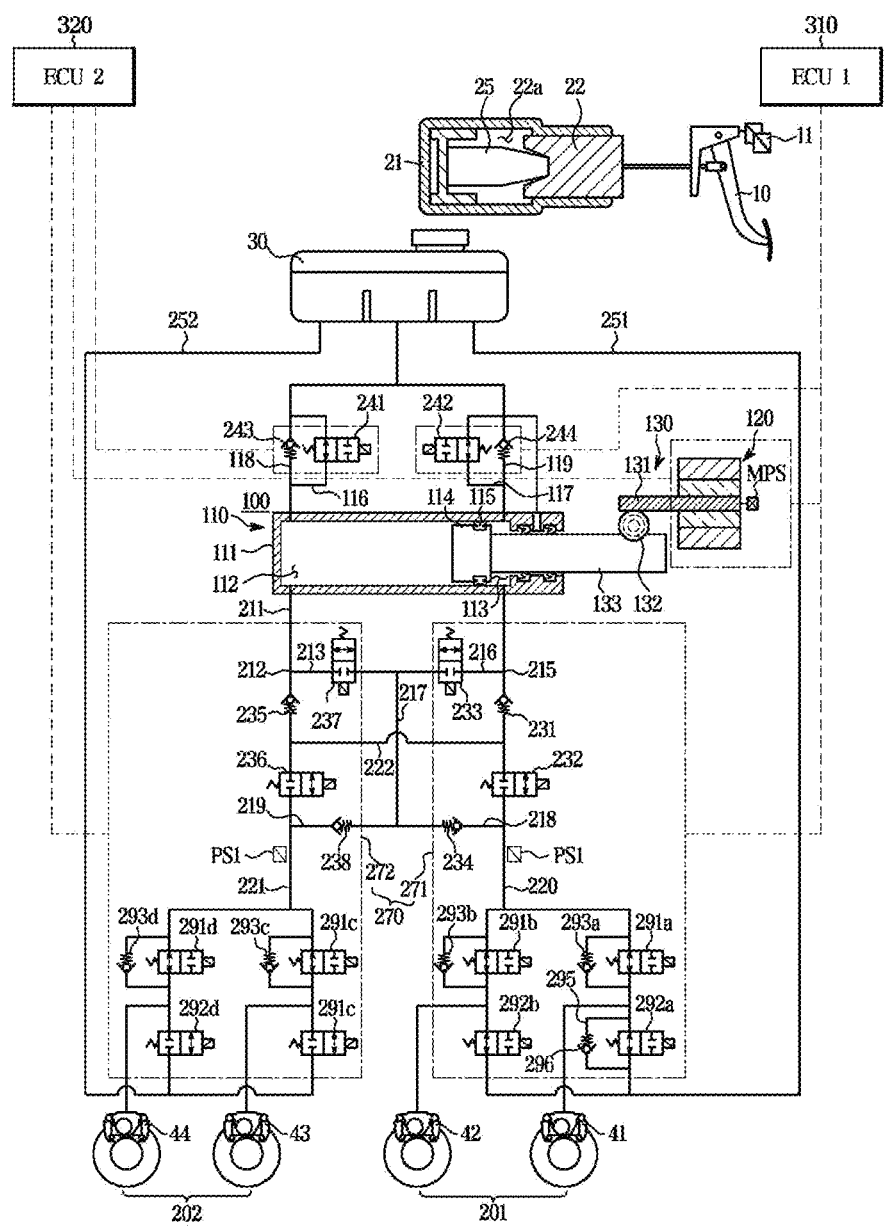

ELECTRONIC BRAKE SYSTEM AND OPERATION METHOD

CROSS-REFERENCE TO RELATED APPLICATIONS

This application is the national stage of International Application No. PCT/KR2020/003470, filed on Mar. 12, 2020, which claims priority, under 35 U.S.C. 119 (a), to Korean Patent Application No. 10-2019-0028335 filed in the Korean Intellectual Property Office on Mar. 12, 2019, the disclosure of which is incorporated by reference herein in their entireties.

TECHNICAL FIELD

The present disclosure relates to an electronic brake system and an operation method thereof, and more particularly, to an electronic brake system and an operation method thereof for generating a braking force using a signal corresponding to a displacement of a brake pedal.

BACKGROUND ART

Vehicles are essentially equipped with a brake system for performing braking, and recently, in order to obtain a stronger and more stable braking force, a system for electronically controlling a braking hydraulic pressure transferred to wheel cylinders mounted on wheels has been proposed.

In a conventional brake system, a method of supplying a hydraulic pressure required for braking to wheel cylinders using a mechanically connected booster when a driver depresses a brake pedal has been mainly used. However, as market demands to implement various braking functions in a detailed response to operation environments of vehicles increase, in recent years, an electronic brake system and an operation method thereof, which include a hydraulic pressure supply device that receives a signal corresponding to a pressing force of a driver from a pedal displacement sensor that detects a displacement of a brake pedal when the driver depresses the brake pedal and supplies a hydraulic pressure required for braking to wheel cylinders, have been widely used.

Because such an electronic brake system and an operation method thereof are controlled by a signal output from an electronic control unit, when a technical problem occurs in the electronic control unit, components of the system become inoperable, and thus a hydraulic pressure required for braking may not be stably generated, which may threaten the safety of passengers.

Therefore, there is a need for a technique capable of individually controlling components provided in each hydraulic circuit by dualizing the hydraulic circuits constituting the system and providing an electronic control unit in each of the hydraulic circuits. That is, it is required that the hydraulic circuit provided with the other electronic control unit operate normally so that at least half of the total braking force may be fully exhibited even when a technical problem occurs in any one of the electronic control units.

DISCLOSURE

Technical Problem

The present disclosure is directed to providing an electronic brake system and an operation method thereof capable of reducing the number of components and implementing a product miniaturization and a lightweight reduction by integrating a master cylinder and a simulation apparatus into one.

The present disclosure is directed to providing an electronic brake system and an operation method thereof capable of implementing stable and effective braking even in various operating situations.

The present disclosure is directed to providing an electronic brake system and an operation method thereof capable of improving performance and operational reliability.

The present disclosure is directed to providing an electronic brake system and an operation method thereof capable of implementing easy assembly of a product, improving productivity of the product and reducing a manufacturing cost of the product.

Technical Solution

An aspect of the present disclosure provides an electronic brake system including a reservoir in which a fluid is stored, a hydraulic pressure supply device configured to generate a hydraulic pressure by operating a hydraulic piston in response to a signal from a pedal displacement sensor detecting a displacement of a brake pedal, a hydraulic control unit including a first hydraulic unit configured to control the hydraulic pressure to be transferred from the hydraulic pressure supply device to a first hydraulic circuit including two wheel cylinders, and a second hydraulic unit configured to control the hydraulic pressure to be transferred from the hydraulic pressure supply device to a second hydraulic circuit including other two wheel cylinders, a master cylinder provided with at least one chamber and piston to pressurize and discharge the fluid, configured to provide a pedal feel in connection with the brake pedal, and connected to the first hydraulic circuit and the second hydraulic circuit, and an electronic control unit configured to control the hydraulic pressure supply device and valves, wherein the electronic control unit includes a first electronic control unit configured to control the first hydraulic unit, and a second electronic control unit configured to be operated separately from the first electronic control unit and to control the second hydraulic unit.

The master cylinder may include a simulation chamber, a simulation piston connected to the brake pedal and provided in the simulation chamber, a master chamber, a master piston provided in the master chamber to be displaceable by a displacement of the simulation piston or a hydraulic pressure of the simulation chamber, and an elastic member provided between the simulation piston and the master piston, and the electronic brake system may further include a reservoir flow path provided to communicate the master cylinder and the reservoir, a first backup flow path provided to connect the simulation chamber and the first hydraulic circuit; and a second backup flow path provided to connect the master chamber and the second hydraulic circuit.

The electronic brake system may further include a first cut valve controlled by the first electronic control unit and provided in the first backup flow path to control a flow of the fluid, and a second cut valve controlled by the second electronic control unit and provided in the second backup flow path to control a flow of the fluid.

The reservoir flow path may include a simulation flow path provided to communicate the simulation chamber and the reservoir, and a simulator valve provided in the simulation flow path to control flows of the fluid in both directions and controlled by the first electronic control unit.

The hydraulic pressure supply device may include a first pressure chamber formed on one side of the hydraulic piston and a second pressure chamber formed on the other side of the hydraulic piston, and the hydraulic control unit may include a first hydraulic flow path provided to communicate with the first pressure chamber, a second hydraulic flow path and a third hydraulic flow path provided to be branched from the first hydraulic flow path, a fourth hydraulic flow path provided to communicate with the second pressure chamber, a fifth hydraulic flow path and a sixth hydraulic flow path provided to be branched from the fourth hydraulic flow path, a seventh hydraulic flow path in which the third hydraulic flow path and the sixth hydraulic flow path join, an eighth hydraulic flow path and a ninth hydraulic flow path provided to be branched from the seventh hydraulic flow path, a tenth hydraulic flow path in which the eighth hydraulic flow path and the fifth hydraulic flow path join and connected to the first hydraulic circuit, an eleventh hydraulic flow path in which the ninth hydraulic flow path and the second hydraulic flow path join and connected to the second hydraulic circuit, and a twelfth hydraulic flow path provided to connect the second hydraulic flow path and the fifth hydraulic flow path.

The first hydraulic unit may include a first valve provided at a front end of the fifth hydraulic flow path to control a flow of the fluid, a second valve provided at a rear end of the fifth hydraulic flow path to control a flow of the fluid, a third valve provided in the sixth hydraulic flow path to control a flow of the fluid, and a fourth valve provided in the eighth hydraulic flow path to control a flow of the fluid, and the second hydraulic unit may include a fifth valve provided at a front end of the second hydraulic flow path to control a flow of the fluid, a sixth valve provided at a rear end of the second hydraulic flow path to control a flow of the fluid, a seventh valve provided in the third hydraulic flow path to control a flow of the fluid, and an eighth valve provided in the ninth hydraulic flow path to control a flow of the fluid.

The first valve may be provided as a check valve that allows only a flow of the fluid from the second pressure chamber toward the rear end of the fifth hydraulic flow path or the twelfth hydraulic flow path, the fourth valve may be provided as a check valve that allows only a flow of the fluid from the first hydraulic circuit toward the seventh hydraulic flow path, the fifth valve may be provided as a check valve that allows only a flow of the fluid from the first pressure chamber toward the rear end of the second hydraulic flow path or the twelfth hydraulic flow path, the eighth valve may be provided as a check valve that allows only a flow of the fluid from the second hydraulic circuit toward the seventh hydraulic flow path, and the second valve, the third valve, the sixth valve, and the seventh valve may be provided as solenoid valves that control flows of the fluid in both directions.

The hydraulic pressure supply device may include a first pressure chamber formed on one side of the hydraulic piston and a second pressure chamber formed on the other side of the hydraulic piston, and the electronic brake system may further include a first dump flow path provided to connect the first pressure chamber and the reservoir, a second dump flow path connecting the second pressure chamber and the reservoir, a first dump valve controlled by the second electronic control unit and provided in the first dump flow path to control flows of the fluid in both directions, and a second dump valve controlled by the first electronic control unit and provided in the second dump flow path to control flows of the fluid in both directions.

The first hydraulic unit may include a first inlet valve and a second inlet valve provided to control flows of the fluid supplied to the first hydraulic circuit, respectively, and the second hydraulic unit may include a third inlet valve and a fourth inlet valve provided to control flows of the fluid supplied to the second hydraulic circuit, respectively, and a first outlet valve and a second outlet valve provided to control flows of the fluid discharged from the second hydraulic circuit to the reservoir, respectively.

Another aspect of the present disclosure provides an operation method of an electronic brake system including a normal operation mode in which both the first electronic control unit and the second electronic control unit operate normally, a first abnormal operation mode in which both the first electronic control unit and the second electronic control unit operate abnormally, a second abnormal operation mode in which the first electronic control unit operates normally and the second electronic control unit operates abnormally, and a third abnormal operation mode in which the first electronic control unit operates abnormally and the second electronic control unit operates normally.

In the normal operation mode, the master chamber may be sealed by closing the first cut valve and the second cut valve, the simulation chamber and the reservoir may communicate with each other by opening the simulator valve, the simulation piston may compress the elastic member by an operation of the brake pedal so that an elastic restoring force of the elastic member is provided to a driver as a pedal feeling, and the hydraulic pressure supply device may provide the hydraulic pressure to the first hydraulic circuit and the second hydraulic circuit by an operation of the hydraulic piston.

In the first abnormal operation mode, the simulation chamber and the first hydraulic circuit may communicate with each other by opening the first cut valve, the master chamber and the second hydraulic circuit may communicate with each other by opening the second cut valve, the fluid in the simulation chamber may be provided to the first hydraulic circuit through the first backup flow path by a pressing force of the brake pedal, and the fluid in the master chamber may be provided to the second hydraulic circuit through the second backup flow path by the pressing force of the brake pedal.

In the second abnormal operation mode, the simulation chamber and the reservoir may communicate with each other by opening the simulator valve, the first backup flow path may be blocked by closing the first cut valve, the master chamber and the second hydraulic circuit may communicate with each other by opening the second cut valve, the simulation piston may compress the elastic member by an operation of the brake pedal so that an elastic restoring force of the elastic member is provided to a driver as a pedal feeling, the fluid in the master chamber may be provided to the second hydraulic circuit through the second backup flow path by a forward movement of the master piston, and the hydraulic pressure supply device may provide the hydraulic pressure to the first hydraulic circuit through the first hydraulic unit controlled by the first electronic control unit.

In the third abnormal operation mode, the simulation flow path may be blocked by closing the simulator valve, the simulation chamber and the first hydraulic circuit may communicate with each other by opening the first cut valve, the second backup flow path may be blocked by closing the second cut valve, the fluid in the simulation chamber may be provided to the first hydraulic circuit through the first backup flow path by an operation of the brake pedal, and the hydraulic pressure supply device may provide the hydraulic pressure to the second hydraulic circuit through the second hydraulic unit controlled by the second electronic control unit.

The master cylinder may include a simulation chamber, a simulation piston connected to the brake pedal and provided in the simulation chamber, a first master chamber, a first master piston provided in the first master chamber to be displaceable by a displacement of the simulation piston or a hydraulic pressure of the simulation chamber, a second master chamber, a second master piston provided in the second master chamber to be displaceable by a displacement of the first master piston or a hydraulic pressure of the first master chamber, and an elastic member provided between the simulation piston and the first master piston, and the electronic brake system may further include a reservoir flow path provided to communicate the master cylinder and the reservoir communicate, a first backup flow path provided to connect the simulation chamber and the second master chamber to the first hydraulic circuit, and a second backup flow path provided to connect the first master chamber and the second hydraulic circuit.

The electronic brake system may further include a first cut valve controlled by the first electronic control unit and provided in the first backup flow path to control a flow of the fluid, and a second cut valve controlled by the second electronic control unit and provided in the second backup flow path to control a flow of the fluid.

The reservoir flow path may include a simulation flow path provided to communicate the simulation chamber and the reservoir, and a simulator valve provided in the simulation flow path to control a flow of the fluid and controlled by the first electronic control unit.

Another aspect of the present disclosure provides an electronic brake system including a simulator configured to provide a reaction force corresponding to a pressing force of a brake pedal, a hydraulic pressure supply device configured to generate a hydraulic pressure by operating a hydraulic piston in response to a signal from a pedal displacement sensor detecting a displacement of the brake pedal and including a first pressure chamber formed on one side of the hydraulic piston and a second pressure chamber formed on the other side of the hydraulic piston, a hydraulic control unit including a first hydraulic unit configured to control the hydraulic pressure to be transferred from the hydraulic pressure supply device to a first hydraulic circuit including two wheel cylinders, and a second hydraulic unit configured to control the hydraulic pressure to be transferred from the hydraulic pressure supply device to a second hydraulic circuit including other two wheel cylinders, and an electronic control unit including a first electronic control unit configured to control the hydraulic pressure supply device and the first hydraulic unit, and a second electronic control unit configured to be operated separately from the first electronic control unit and to control the hydraulic pressure supply device and the second hydraulic unit, wherein the hydraulic control unit includes a first hydraulic flow path provided to communicate with the first pressure chamber, a second hydraulic flow path and a third hydraulic flow path provided to be branched from the first hydraulic flow path, a fourth hydraulic flow path provided to communicate with the second pressure chamber, a fifth hydraulic flow path and a sixth hydraulic flow path provided to be branched from the fourth hydraulic flow path, a seventh hydraulic flow path in which the third hydraulic flow path and the sixth hydraulic flow path join, an eighth hydraulic flow path and a ninth hydraulic flow path provided to be branched from the seventh hydraulic flow path, a tenth hydraulic flow path in which the eighth hydraulic flow path and the fifth hydraulic flow path join and connected to the first hydraulic circuit, an eleventh hydraulic flow path in which the ninth hydraulic flow path and the second hydraulic flow path join and connected to the second hydraulic circuit, and a twelfth hydraulic flow path provided to connect the second hydraulic flow path and the fifth hydraulic flow path, and wherein the simulator is provided to be hydraulically separated from the hydraulic control unit, the first hydraulic circuit, and the second hydraulic circuit.

The first hydraulic unit may include a first valve provided at a front end of the fifth hydraulic flow path to control a flow of the fluid, a second valve provided at a rear end of the fifth hydraulic flow path to control a flow of the fluid, a third valve provided in the sixth hydraulic flow path to control a flow of the fluid, and a fourth valve provided in the eighth hydraulic flow path to control a flow of the fluid, and the second hydraulic unit may include a fifth valve provided at a front end of the second hydraulic flow path to control a flow of the fluid, a sixth valve provided at a rear end of the second hydraulic flow path to control a flow of the fluid, a seventh valve provided in the third hydraulic flow path to control a flow of the fluid, and an eighth valve provided in the ninth hydraulic flow path to control a flow of the fluid.

The first valve may be provided as a check valve that allows only a flow of the fluid from the second pressure chamber toward the rear end of the fifth hydraulic flow path or the twelfth hydraulic flow path, the fourth valve may be provided as a check valve that allows only a flow of the fluid from the first hydraulic circuit toward the seventh hydraulic flow path, the fifth valve may be provided as a check valve that allows only a flow of the fluid from the first pressure chamber toward the rear end of the second hydraulic flow path or the twelfth hydraulic flow path, the eighth valve may be provided as a check valve that allows only a flow of the fluid from the second hydraulic circuit toward the seventh hydraulic flow path, and the second valve, the third valve, the sixth valve, and the seventh valve may be provided as solenoid valves that control flows of the fluid in both directions.

Advantageous Effects

An electronic brake system and an operation method thereof according to the present embodiment can reduce the number of components and implement a product miniaturization and a lightweight reduction.

The electronic brake system and the operation method thereof according to the present embodiment can implement stable and effective braking in various operating situations of a vehicle.

The electronic brake system and the operation method thereof according to the present embodiment can improve performance and operational reliability of a product.

The electronic brake system and the operation method thereof according to the present embodiment can stably provide a braking pressure even in case of a breakdown of components or leak of a fluid.

The electronic brake system and the operation method thereof according to the present embodiment can implement easy assembly of the product, improve productivity of the product and reducing a manufacturing cost of the product.

DESCRIPTION OF DRAWINGS

FIG. 1 is a perspective view illustrating an electronic control unit constituting an electronic brake system according to an embodiment of the present disclosure.

FIG. 2 is a schematic diagram illustrating the electronic control unit according to an embodiment of the present disclosure.

FIG. 3 is a perspective view illustrating an electronic control unit constituting an electronic brake system according to another embodiment of the present disclosure.

FIG. 4 is a schematic diagram illustrating the electronic control unit according to another embodiment of the present disclosure.

FIG. 5 is a hydraulic circuit diagram illustrating an electronic brake system according to a first embodiment of the present disclosure.

FIG. 6 is a hydraulic circuit diagram illustrating an operation of providing a hydraulic pressure when the electronic brake system according to the first embodiment of the present disclosure is normally operated.

FIG. 7 is a hydraulic circuit diagram illustrating an operation of providing a hydraulic pressure in a first abnormal operation mode (fallback mode) when the electronic brake system according to the first embodiment of the present disclosure is abnormally operated.

FIG. 8 is a hydraulic circuit diagram illustrating a braking operation in a second abnormal operation mode of the electronic brake system according to the first embodiment of the present disclosure.

FIG. 9 is a hydraulic circuit diagram illustrating a braking release operation in the second abnormal operation mode of the electronic brake system according to the first embodiment of the present disclosure.

FIG. 10 is a hydraulic circuit diagram illustrating a braking operation in a third abnormal operation mode of the electronic brake system according to the first embodiment of the present disclosure.

FIG. 11 is a hydraulic circuit diagram illustrating a braking release operation in the third abnormal operation mode of the electronic brake system according to the first embodiment of the present disclosure.

FIG. 12 is a hydraulic circuit diagram illustrating an electronic brake system according to a second embodiment of the present disclosure.

FIG. 13 is a hydraulic circuit diagram illustrating an operation of providing a hydraulic pressure when the electronic brake system according to the second embodiment of the present disclosure is normally operated.

FIG. 14 is a hydraulic circuit diagram illustrating an operation of providing a hydraulic pressure in a first abnormal operation mode (fallback mode) when the electronic brake system according to the second embodiment of the present disclosure is abnormally operated.

FIG. 15 is a hydraulic circuit diagram illustrating a braking operation in a second abnormal operation mode of the electronic brake system according to the second embodiment of the present disclosure.

FIG. 16 is a hydraulic circuit diagram illustrating a braking release operation in the second abnormal operation mode of the electronic brake system according to the second embodiment of the present disclosure.

FIG. 17 is a hydraulic circuit diagram illustrating a braking operation in a third abnormal operation mode of the electronic brake system according to the second embodiment of the present disclosure.

FIG. 18 is a hydraulic circuit diagram illustrating a braking release operation in the third abnormal operation mode of the electronic brake system according to the second embodiment of the present disclosure.

FIG. 19 is a hydraulic circuit diagram illustrating an electronic brake system according to a third embodiment of the present disclosure.

MODE OF THE DISCLOSURE

Hereinafter, an embodiment of the present disclosure will be described in detail with reference to the accompanying drawings. The following embodiment is provided to fully convey the spirit of the present disclosure to a person having ordinary skill in the art to which the present disclosure belongs. The present disclosure is not limited to the embodiment shown herein but may be embodied in other forms. The drawings are not intended to limit the scope of the present disclosure in any way, and the size of components may be exaggerated for clarity of illustration.

FIG. 1 is a perspective view illustrating an electronic control unit constituting an electronic brake system according to an embodiment of the present disclosure, and FIG. 2 is a schematic diagram illustrating the electronic control unit according to an embodiment of the present disclosure. FIG. 3 is a perspective view illustrating an electronic control unit constituting an electronic brake system according to another embodiment of the present disclosure, and FIG. 4 is a schematic diagram illustrating the electronic control unit according to another embodiment of the present disclosure.

Referring to the drawings, an electronic brake system according to the present embodiment includes a block 330 having components, which will be described later, therein, a motor 120 provided in a hydraulic pressure supply device to generate a driving force in response to a signal output from first and second electronic control units 310 and 320, first and second power supply lines 311 and 312 provided to connect the first electronic control unit 310 and the motor 120 and the second electronic control unit 320 and the motor 120, respectively, to receive power from the first and second electronic control units 310 and 320, and a communication line 313 provided such that the first and second electronic control units 310 and 320 are connect to communicate with each other.

The electronic control unit may be separated into the first electronic control unit 310 and the second electronic control unit 320, and in this case, the first electronic control unit 310 is embedded in a first housing, and the second electronic control unit 320 is embedded in a second housing.

A first connector 301 is electrically connected to the first electronic control unit 310 and coupled to the end of one surface of the first housing, and a second connector 302 is electrically connected to the second electronic control unit 320 and coupled to the end of one surface of the second housing.

According to an embodiment of the present disclosure, the first and second housings in which the first and second electronic control units 310 and 320 are embedded may be disposed on the same surface of the block 330. In this case, the first connector 301 coupled to the first housing and the second connector 302 coupled to the second housing may be disposed on upper portions of surfaces perpendicular to the surface on which the first and second housings are disposed and facing each other. In addition, the motor 120 may be disposed parallel to the first and second housings on a surface facing the surface on which the first and second housings are disposed and perpendicular to the surfaces on which the first and second connectors 301 and 302 are disposed. By the arrangement structure described above, the power supply lines 311 and 312 connect the first and second electronic control units 310 and 320 and the motor 120. In addition, the communication line 313 connects the first and second electronic control units 310 and 320 embedded in the first and second housings disposed on the same surface. As shown, the first and second power supply lines 311 and 312 have a structure penetrating the inside of the block 330 and are provided in a straight shape, but are not limited to any one structure and shape as long as the first and second power supply lines 311 and 312 may connect the first and second electronic control units 310 and 320 and the motor 120. For example, the first and second power supply lines 311 and 312 may include a structure bypassing the block 330 or a structure having a curved shape. In addition, as shown, the communication line 313 is provided in a '⌐' shape, but is not limited to any one shape as long as the communication line 313 may connect the first and second electronic control units 310 and 320.

According to another embodiment of the present disclosure, the first and second housings may be disposed parallel to each other on opposite surfaces of the block 330. In this case, the first connector 301 coupled to the first housing and the second connector 302 coupled to the second housing may be disposed on an upper portion of the same surface perpendicular to the surfaces on which the first and second housings are disposed. The motor 120 may be disposed on a surface perpendicular to the surfaces on which the first and second housings are disposed and facing the surface on which the first and second connectors 301 and 302 are disposed. As shown, the power supply lines 311 and 312 are provided in '⌐' and '⌐' shapes, but are not limited to any one shape as long as the power supply lines 311 and 312 may connect the first and second electronic control units 310 and 320 and the motor 120. In addition, the communication line 313 is provided in a straight shape, but is not limited to any one shape as long as the communication line 313 may connect the first and second electronic control units 310 and 320.

The motor 120 is provided to generate a driving force in response to signals output from the first and second electronic control units 310 and 320. The motor 120 may include a stator and a rotor in which a coil is wound around a core. The stator of the motor 120 may be provided, for example, in a form in which one core is divided into first and second compartments and the coil is wound around each compartment. In this case, the first power supply line 311 connects the first housing to the coil wound around the first compartment of the motor 120, and the second power supply line 312 also connects the second housing to the coil wound around the second compartment of the motor 120. That is, the first and second electronic control units 310 and 320 embedded in the first and second housings may supply power to the coils provided in the first and second compartments, respectively, through the first and second power supply lines 311 and 312.

FIG. 5 is a hydraulic circuit diagram illustrating an electronic brake system 1 according to the present embodiment.

Referring to FIG. 5, the electronic brake system 1 according to the present embodiment includes a reservoir 30 to store a fluid therein, wheel cylinders 41, 42, 43, and 44 to which a hydraulic pressure of the fluid is transferred to brake wheels RR, RL, FR, and FL, respectively, a hydraulic pressure supply device 100 provided to receive a signal corresponding to a pressing force by a driver from a pedal displacement sensor 11 detecting a displacement of a brake pedal 10 and to generate a hydraulic pressure of the fluid through a mechanical operation, the first and second electronic control units 310 and 320 configured to control the hydraulic pressure supply device 100 and various valves based on hydraulic pressure information and pedal displacement information, a hydraulic control unit 270 including a first hydraulic unit 271 configured to control the hydraulic pressure transferred from the hydraulic pressure supply device 100 to a first hydraulic circuit 201 provided with the two wheel cylinders and a second hydraulic unit 272 configured to control the hydraulic pressure transferred from the hydraulic pressure supply device 100 to a second hydraulic circuit 202 provided with the other two wheel cylinders, and a master cylinder 20 including at least one chamber and a piston, provided to pressurize and discharge the fluid while providing a pedal feeling in connection with the brake pedal to the driver, and connected to the first hydraulic circuit 201 and the second hydraulic circuit 202.

As described above, the electronic control unit is separated into separate components and provided as the first and second electronic control units 310 and 320. As described above, the electronic control unit is provided with the first and second electronic control units 310 and 320 as separate components. The first electronic control unit 310 is provided to control an operation of the first hydraulic unit 271, and the second electronic control unit 320 is provided to control an operation of the second hydraulic unit 272. More specifically, the first electronic control unit 310 may control the first hydraulic unit 271 included in the first hydraulic circuit 201 in which the fluid that is transferred to the first and second wheel cylinders 41 and 42 among the four wheel cylinders flows, and the second electronic control unit 320 may control the second hydraulic unit 272 included in the second hydraulic circuit 202 in which the fluid that is transferred to the third and fourth wheel cylinders 43 and 44 among the four wheel cylinders flows.

The electronic brake system 1 according to the present embodiment may further include a simulator provided to provide a reaction force corresponding to the pressing force of the brake pedal 10 to the driver, and the master cylinder 20 provided to pressurize and discharge a fluid such as brake oil accommodated therein. In this case, the first electronic control unit 310 may control an operation of a simulator valve 70 provided on a simulation flow path 61, which will be described later, to control flows in both directions of the fluid transferred through the simulation flow path 61. The second electronic control unit 320 may control an operation of a second cut valve 262 provided in a second backup flow path 252, which will be described later.

The first and second hydraulic units 271 and 272 include a plurality of flow paths and valves to control the hydraulic pressure transferred from the master cylinder 20 or the hydraulic pressure supply device 100 to the wheel cylinders 41, 42, 43, and 44 in response to signals output from the first and second electronic control units 310 and 320.

More specifically, the first hydraulic unit 271 includes a fourth hydraulic flow path 214 in communication with a second pressure chamber 113, a fifth hydraulic flow path 215 and a sixth hydraulic flow path 216 branched from the fourth hydraulic flow path, an eighth hydraulic flow path 218 branched from a seventh hydraulic flow path 217, and an eleventh hydraulic flow path 221 extending from the fifth hydraulic flow path 215. The first hydraulic unit 271 also includes a first valve 231 provided in the fifth hydraulic flow path 215 to control a flow of the fluid, a second valve 232 provided in the eleventh hydraulic flow path 221 to control a flow of the fluid, a third valve 233 provided in the sixth hydraulic flow path 216 to control a flow of the fluid, and a fourth valve 234 provided in the eighth hydraulic flow path 218 to control a flow of the fluid.

The second hydraulic unit 272 includes a first hydraulic flow path 211 in communication with a first pressure chamber 112, a second hydraulic flow path 212 and a third hydraulic flow path 213 branched from the first hydraulic flow path 211, a ninth hydraulic flow path 219 branched from the seventh hydraulic flow path 217 where the second and fifth hydraulic flow paths 212 and 215 join, and a twelfth hydraulic flow path 222 connected to a tenth hydraulic flow path 220 where the third and sixth hydraulic flow paths 213 and 216 join and extends from the second hydraulic flow path 212. The second hydraulic unit 272 also includes a fifth valve 235 provided in the second hydraulic flow path 212 to control a flow of the fluid, a sixth valve 236 provided in the twelfth hydraulic flow path 222 to control a flow of the fluid, a seventh valve 237 provided in the third hydraulic flow path 213 to control a flow of the fluid, and an eighth valve 238 provided in the ninth hydraulic flow path 219 to control a flow of the fluid.

The simulator may be provided to be embedded in the master cylinder 20. That is, the master cylinder 20 includes a simulation chamber 22a and master chambers 23a and 24a, so that the master cylinder 20 may be provided to provide a stable pedal feeling by providing a reaction force to the driver when the driver applies a pressing force to the brake pedal 10 for braking operation, and at the same time to pressurize and discharge the fluid accommodated therein. Specifically, the master cylinder 20 includes a cylinder block 21 forming a chamber therein, the simulation chamber 22a formed on an inlet side of the cylinder block 21 to which the brake pedal 10 is connected, a simulation piston 22 provided in the simulation chamber 22a and connected to the brake pedal 10 to be displaceable depending on the operation of the brake pedal 10, the first master chamber 23a, a first master piston 23 provided in the first master chamber 23a to be displaceable by a displacement of the simulation piston 22 or a hydraulic pressure generated in the simulation chamber 22a depending on the displacement of the simulation piston 22, the second master chamber 24a, a second master piston 24 provided in the second master chamber 24a to be displaceable by a displacement of the first master piston 23 or a hydraulic pressure generated in the first master chamber 23a depending on the displacement of the first master piston 23, an elastic member 25 provided between the simulation piston 22 and the first master piston 23 to provide the pedal feeling through an restoring force generated during compression, a simulator spring 22b provided to elastically support the simulation piston 22, a first piston spring 23b provided to elastically support the first master piston 23, and a second piston spring 24b provided to elastically support the second master piston 24.

The simulation piston 22, the first master piston 23 and the second master piston 24 are disposed in the simulation chamber 22a, the first master chamber 23a and the second master chamber 24a, respectively, to pressurize the fluid accommodated in the respective chambers or generate a negative pressure depending on a forward or backward movement. The simulation piston 22 connected to an input rod of the brake pedal 10 may be accommodated in the simulation chamber 22a to enable reciprocating movement. Because the simulation chamber 22a is in communication with the reservoir 30 through the simulation flow path 61 in an open state of the simulator valve 70, which will be described later, in this state, even when the simulation piston 22 moves forward, the fluid accommodated in the simulation chamber 22a is not pressurized. However, because the simulation chamber 22a and the reservoir 30 are blocked when the simulator valve 70 is closed, the simulation chamber 22a is closed so that the fluid inside the simulation chamber 22a may be pressurized according to the forward movement of the simulation piston 22. A detailed description thereof will be given later.

The first master chamber 23a may be formed inside the simulation chamber 22a on the cylinder block 21 (the left side based on FIG. 5), and the first master piston 23 may be accommodated in the first master chamber 23a to enable reciprocating movement. The first master piston 23 may be accommodated in the first master chamber 23a to pressurize the fluid accommodated in the first master chamber 23a by moving forward or to generate a negative pressure inside the first master chamber 23a by moving backward. Specifically, as a volume of the first master chamber 23a decreases when the first master piston 23 moves forward, the fluid present in the first master chamber 23a may be pressurized to generate a hydraulic pressure. Conversely, as the volume of the first master chamber 23a increases when the first master piston 23 moves backward, the fluid present in the first master chamber 23a may be depressurized, and at the same time generate a negative pressure inside the first master chamber 23a. The second master chamber 24a may be formed inside the first master chamber 23a on the cylinder block 21 (the left side base on FIG. 5), and the second master piston 24 may be accommodated in the second master chamber 24a to enable reciprocating movement. The second master piston 24 may be accommodated in the second master chamber 24a to pressurize the fluid accommodated in the second master chamber 24a by moving forward or to generate a negative pressure inside the second master chamber 24a by moving backward. Specifically, as a volume of the second master chamber 24a decreases when the second master piston 24 moves forward, the fluid present in the second master chamber 24a may be pressurized to generate a hydraulic pressure. Conversely, as the volume of the second master chamber 24a increases when the second master piston 24 moves backward, the fluid present in the second master chamber 24a may be depressurized, and at the same time generate a negative pressure inside the second master chamber 24a.

The simulator spring 22b is provided to elastically support the simulation piston 22. As the brake pedal 10 operates, the simulation piston 22 is displaced, and at the same time the simulator spring 22b is compressed. Thereafter, when the pressing force of the brake pedal 10 is released, the simulator spring 22b is extended by its elastic force, and the simulation piston 22 may be returned to its original position. The first piston spring 23b and the second piston spring 24b are provided to elastically support the first master piston 23 and the second master piston 24, respectively. When the first master piston 23 and the second master piston 24 are displaced due to an operation such as braking, the first piston spring 23b and the second piston spring 24b are respectively compressed, and thereafter, when the operation such as braking is released, the first piston spring 23b and the second piston spring 24b are extended by their elastic forces, so that the first master piston 23 and the second master piston 24 may be returned to their original positions, respectively. The elastic member 25 is disposed between the simulation piston 22 and the first master piston 23 and provided to provide the pedal feeling of the brake pedal 10 to the driver by its own elastic restoring force. The elastic member 25 may be made of a material such as compressible and expandable rubber, and when the simulation piston 22 is displaced by the operation of the brake pedal 10, the elastic member 25 is compressed, and the driver may receive a stable and familiar pedal feel by the elastic restoring force of the compressed elastic member 25.

A reservoir flow path may include the simulation flow path 61 to connect the simulation chamber 22a and the reservoir 30, a first reservoir flow path 62 to connect the first master chamber 23a and the reservoir 30, a second reservoir flow path 63 to connect the second master chamber 24a and the reservoir 30, and an auxiliary reservoir flow path 65 to auxiliary connect the simulation chamber 22a and the reservoir 30. The simulation flow path 61 may be provided with the simulator valve 70 provided to control flows in both directions of the fluid transferred through the simulation flow path 61, and the simulator valve 70 may be provided as a normally closed type solenoid valve that operates to be opened when a signal is received from the first electronic control unit 310 in a normally closed state. The reservoir flow path 60 may further include a reservoir bypass flow path 64 connected in parallel to the simulator valve 70 on the simulation flow path 61. To this end, in the reservoir bypass flow path 64, a simulator check valve 71 that allows only a flow of the fluid from the reservoir 30 toward the simulation chamber 22a. In the drawings, the several reservoirs 30 are shown and the reservoirs 30 are assigned the same reference numeral. The reservoirs 30 may be provided as the same component or different components.

Explaining a pedal simulation operation by the master cylinder 20, in a normal operation, by the operation of the brake pedal 10 by the driver and at the same time the operation of the first electronic control unit 310, the second cut valve 262 and first cut valves 292a and 292b are closed, the simulator valve 70 in the simulation flow path 61 is opened, and the second cut valve 262 is closed by the operation of the second electronic control unit 320. As the operation of the brake pedal 10 proceeds, the simulation piston 22 moves forward, but a first backup flow path 251 and the second backup flow path 252 are closed by a closing operation of the second cut valve 262 and the first cut valves 292a and 292b, and thus displacement of the first master piston 23 and the second master piston 24 is not generated. Therefore, the elastic member 25 is compressed by the displacement of the simulation piston 22, and the elastic restoring force by the compression of the elastic member 25 may be provided to the driver as the pedal feel. At this time, the fluid accommodated in the simulation chamber 22a is transferred to the reservoir 30 through the simulation flow path 61. Thereafter, when the driver releases the pressing force of the brake pedal 10, as the simulator spring 22b and the elastic member 25 extend by their elastic forces, the simulation piston 22 is returned to its original position, and the simulation chamber 22a may be filled with the fluid supplied through the simulation flow path 61 and the reservoir bypass flow path 64.

As such, the inside of the simulation chamber 22a is always filled with the fluid, when a pedal simulation is operated, friction between the simulation piston 22 and the cylinder block 21 is minimized, thereby improving durability of the master cylinder 20 and preventing inflow of foreign substances from the outside.

When the electronic brake system 1 is abnormally operated, that is, in an operating state of a fallback mode, an operation of the master cylinder 20 will be described later with reference to FIG. 7.

The hydraulic pressure supply device 100 is provided to receive a signal corresponding to the pressing force of the driver from the pedal displacement sensor 11 detecting a displacement of the brake pedal 10 and to generate a hydraulic pressure of the fluid through a mechanical operation. The hydraulic pressure supply device 100 may include a hydraulic pressure providing unit 110 to provide a fluid pressure to be transferred to the wheel cylinders, the motor 120 to generate a rotational force in response to a signal from the pedal displacement sensor 11, and a power conversion unit 130 to convert a rotational motion of the motor 120 into a linear motion to provide the linear motion to the hydraulic pressure providing unit 110. The hydraulic pressure providing unit 110 also includes a cylinder block 111 provided to accommodate the fluid, a hydraulic piston 114 accommodated in the cylinder block 111, a sealing member 115 provided between the hydraulic piston 114 and the cylinder block 111 to seal the pressure chambers 112 and 113, and a drive shaft 133 to transfer power output from the power conversion unit 130 to the hydraulic piston 114.

The pressure chambers 112 and 113 may include the first pressure chamber 112 located on a front side of the hydraulic piston 114 (left direction of the hydraulic piston 114 based on FIG. 5), and the second pressure chamber 113 located on a rear side of the hydraulic piston 114 (right direction of the hydraulic piston 114 based on FIG. 5). That is, the first pressure chamber 112 is provided to be partitioned by the cylinder block 111 and a front surface of the hydraulic piston 114 so that a volume thereof is varied depending on the movement of the hydraulic piston 114, and the second pressure chamber 113 is provided to be partitioned by the cylinder block 111 and a rear surface of the hydraulic piston 114 so that a volume thereof is varied depending on the movement of the hydraulic piston 114. The first pressure chamber 112 is connected to the first hydraulic flow path 211, which will be described later, through a first communication hole formed on the cylinder block 111, and the second pressure chamber 113 is connected to the fourth hydraulic flow path 214, which will be described later, through a second communication hole formed on the cylinder block 111. The sealing member includes the piston sealing member 115 provided between the hydraulic piston 114 and the cylinder block 111 to seal between the first pressure chamber 112 and the second pressure chamber 113, and the drive shaft 133 sealing member provided between the drive shaft 133 and the cylinder block 111 to seal between the second pressure chamber 113 and opening of the cylinder block 111. A hydraulic pressure or negative pressure in the first pressure chamber 112 and the second pressure chamber 113 generated by the forward or backward movement of the hydraulic piston 114 may not leak by being sealed by the piston sealing member 115 and the drive shaft 133 sealing member and may be transferred to the first hydraulic flow path 211 and the fourth hydraulic flow path 214, which will be described later. The first pressure chamber 112 and the second pressure chamber 113 are connected to the reservoir 30 by a first dump flow path 116 and a second dump flow path 117, and a first bypass flow path 118 and a second bypass flow path 119, respectively, and thus the first pressure chamber 112 and the second pressure chamber 113 may receive and accommodate the fluid from the reservoir 30, or the fluid in the first pressure chamber 112 or the second pressure chamber 113 may be transferred to the reservoir 30. To this end, the first dump flow path 116 may connected to the reservoir 30 by being in communication with the first pressure chamber 112 through a third communication hole formed on the cylinder block 111, and the second dump flow path 117 may be connected to the reservoir 30 by being in communication with the second pressure chamber 113 through a fourth communication hole formed on the cylinder block 111. In addition, the first bypass flow path 118 may be connected to rejoin after being branched from the first dump flow path 116, and the second bypass flow path 119 may be connected to rejoin after being branched from the second dump flow path 117.

A first dump valve 241 and a second dump valve 242 for controlling a flow of the fluid may be provided in the first dump flow path 116 and the second dump flow path 117, respectively. Referring to FIG. 5, the first dump valve 241 may be provided as a two-way solenoid valve that controls a flow of the fluid between the first pressure chamber 112 and the reservoir 30, and the second dump valve 242 may be provided as a two-way solenoid valve that controls a flow of the fluid between the second pressure chamber 113 and the reservoir 30. The first dump valve 241 may be provided as a normally open type solenoid valve that operates to be closed when a signal is received from the second electronic control unit 320 in a normally open state, and the second dump valve 242 may be provided as a normally open type solenoid valve that operates to be closed when a signal is received from the first electronic control unit 310 in a normally open state. The first bypass flow path 118 is connected to the first dump flow path 116 to be parallel to the first dump valve 241, and a first dump check valve 243 for controlling the flow of the fluid between the first pressure chamber 112 and the reservoir 30 may be provided in the first bypass flow path 118. In other words, the first bypass flow path 118 may be connected by bypassing a front side and a rear side of the first dump valve 241 on the first dump flow path 116, and the first dump check valve 243 may be provided to allow only the flow of the fluid from the reservoir 30 toward the first pressure chamber 112 and to block the flow of the fluid in the opposite direction. Also, the second bypass flow path 119 is connected to the second dump flow path 117 to be parallel to the second dump valve 242, and a second dump check valve 244 for controlling the flow of the fluid between the second pressure chamber 113 and the reservoir 30 may be provided in the second bypass flow path 119. In other words, the second bypass flow path 119 may be connected by bypassing a front side and a rear side of the second dump valve 242 on the second dump flow path 117, and the second dump check valve 244 may be provided to allow only the flow of the fluid from the reservoir 30 toward the second pressure chamber 113 and to block the flow of the fluid in the opposite direction.

The motor 120 is provided to generate a driving force by a signal output from the first and second electronic control units 310 and 320. The motor 120 may include a stator and a rotor, and through this configuration, may provide power to generate a displacement of the hydraulic piston 114 by rotating in a forward or reverse direction. A rotational angular speed and a rotational angle of the motor 120 may be precisely controlled by a motor control sensor MPS. Because the motor 120 is a well-known technology, a detailed description thereof will be omitted. The power conversion unit 130 is provided to convert a rotational force of the motor 120 into a linear motion. The power conversion unit 130 may be provided as a structure including, for example, a worm shaft 131, a worm wheel 132 and the drive shaft 133. The worm shaft 131 may be integrally formed with a rotation shaft of the motor 120 and may rotate the worm wheel 132 by a worm formed on an outer circumferential surface thereof to be engaged with the worm wheel 132. The worm wheel 132 may linearly move the drive shaft 133 by being connected to be engaged with the drive shaft 133, and the drive shaft 133 is connected to the hydraulic piston 114 whereby the hydraulic piston 114 may be slidably moved within the cylinder block 111.

Explaining the above operations again, when the displacement of the brake pedal 10 is detected by the pedal displacement sensor 11, the detected signal is transferred to the first and second electronic control units 310 and 320, and the first and second electronic control units 310 and 320 drive the motor 120 to rotate the worm shaft 131 in one direction. The rotational force of the worm shaft 131 is transferred to the drive shaft 133 via the worm wheel 132, and the hydraulic piston 114 connected to the drive shaft 133 moves forward in the cylinder block 111, thereby generating a hydraulic pressure in the first pressure chamber 112.

Conversely, when the pressing force of the brake pedal 10 is released, the first and second electronic control units 310 and 320 drive the motor 120 to rotate the worm shaft 131 in the opposite direction. Accordingly, the worm wheel 132 also rotates in the opposite direction, and the hydraulic piston 114 connected to the drive shaft 133 moves backward in the cylinder block 111, thereby generating a negative pressure in the first pressure chamber 112. The generation of hydraulic pressure and negative pressure in the second pressure chamber 113 may be implemented by operating opposite to the above operations. That is, when the displacement of the brake pedal 10 is detected by the pedal displacement sensor 11, the detected signal is transferred to the first and second electronic control units 310 and 320, and the first and second electronic control units 310 and 320 drive the motor 120 to rotate the worm shaft 131 in the opposite direction. The rotational force of the worm shaft 131 is transferred to the drive shaft 133 via the worm wheel 132, and the hydraulic piston 114 connected to the drive shaft 133 moves backward in the cylinder block 111, thereby generating a hydraulic pressure in the second pressure chamber 113. Conversely, when the pressing force of the brake pedal 10 is released, the first and second electronic control units 310 and 320 drive the motor 120 in one direction to rotate the worm shaft 131 in one direction. Accordingly, the worm wheel 132 also rotates in the opposite direction, and the hydraulic piston 114 connected to the drive shaft 133 moves forward in the cylinder block 111, thereby generating a negative pressure in the second pressure chamber 113.

As such, the hydraulic pressure supply device 100 may generate a hydraulic pressure or negative pressure in the first pressure chamber 112 and the second pressure chamber 113, respectively, depending on the rotation direction of the worm shaft 131 by the operation of the motor 120, and whether the hydraulic pressure is transferred to the chambers to perform braking, or whether the negative pressure is generated in the chambers to release the braking may be determined by controlling the valves. A detailed description thereof will be given later. The power conversion unit 130 according to the present embodiment is not limited to any one structure as long as it may convert the rotational motion of the motor 120 into the linear motion of the hydraulic piston 114, and may include devices having various structures and manners.

Hereinafter, with reference to FIG. 5 again, the above-described first and second hydraulic units 271 and 272 included in the first and second hydraulic circuits 201 and 202 will be described in more detail.

Referring to FIG. 5, the first hydraulic flow path 211 is provided to be in communication with the first pressure chamber 112 and may be branched into the second hydraulic flow path 212 and the third hydraulic flow path 213. Also, the fourth hydraulic flow path 214 is provided to be in communication with the second pressure chamber 113 and may be branched into the fifth hydraulic flow path 215 and the sixth hydraulic flow path 216.

The fifth valve 235 for controlling a flow of the fluid may be provided at a front end of the second hydraulic flow path 212. The fifth valve 235 may be provided as a check valve that allows only a flow of the fluid in a direction of being discharged from the first pressure chamber 112 and blocks a flow of the fluid in the opposite direction. That is, the fifth valve 235 may allow the hydraulic pressure generated in the first pressure chamber 112 to be transferred to a rear end of the second hydraulic flow path 212 and the twelfth hydraulic flow path 222 while preventing the fluid flowing in the opposite direction from leaking to the first pressure chamber 112 through the second hydraulic flow path 212.

The sixth valve 236 for controlling a flow of the fluid may be provided at the rear end of the second hydraulic flow path 212. The sixth valve 236 may be provided as a two-way control valve for controlling the flow of fluid transferred along the second hydraulic flow path 212. The sixth valve 236 may be provided as a normally closed type solenoid valve that operates to be opened when a signal is received from the second electronic control unit 320 in a normally closed state.

The first valve 231 for controlling a flow of fluid may be provided at a front end of the fifth hydraulic flow path 215. The first valve 231 may be provided as a check valve that allows only a flow of the fluid in a direction of being discharged from the second pressure chamber 113 and blocks a flow of the fluid in the opposite direction. That is, the first valve 231 may allow the hydraulic pressure generated in the second pressure chamber 113 to be transferred to a rear end of the fifth hydraulic flow path 215 and the twelfth hydraulic flow path 222 while preventing the fluid flowing in the opposite direction from leaking to the second pressure chamber 113 through the fifth hydraulic flow path 215.

The second valve 232 for controlling a flow of the fluid may be provided at the rear end of the fifth hydraulic flow path 215. The second valve 232 may be provided as a two-way control valve for controlling the flow of fluid transferred along the fifth hydraulic flow path 215. The second valve 232 may be provided as a normally closed type solenoid valve that operates to be opened when a signal is received from the first electronic control unit 310 in a normally closed state.

The seventh valve 237 for controlling a flow of the fluid may be provided in the third hydraulic flow path 213. The seventh valve 237 may be provided as a two-way control valve for controlling the flow of fluid transferred along the third hydraulic flow path 213. The seventh valve 237 may be provided as a normally closed type solenoid valve that operates to be opened when a signal is received from the second electronic control unit 320 in a normally closed state.

The third valve 233 for controlling a flow of the fluid may be provided in the sixth hydraulic flow path 216. The third valve 233 may be provided as a two-way control valve for controlling the flow of fluid transferred along the sixth hydraulic flow path 216. The third valve 233 may be provided as a normally closed type solenoid valve that operates to be opened when a signal is received from the first electronic control unit 310 in a normally closed state.

The seventh hydraulic flow path 217 may be provided by joining the third hydraulic flow path 213 and the sixth hydraulic flow path 216, and the seventh hydraulic flow path 217 may be provided by branching into the eighth hydraulic flow path 218 and the ninth hydraulic flow path 219.

The fourth valve 234 for controlling a flow of fluid may be provided in the eighth hydraulic flow path 218. The fourth valve 234 may be provided as a check valve that allows only a flow of the fluid in a direction of being discharged from the seventh pressure chamber 117 and blocks a flow of the fluid in the opposite direction. That is, the fourth valve 234 may allow the hydraulic pressure generated in the first hydraulic circuit 201 to be transferred to the seventh hydraulic flow path 217 while preventing the fluid flowing in the opposite direction from leaking to the first hydraulic circuit 201 through the eighth hydraulic flow path 218.

The eighth valve 238 for controlling a flow of fluid may be provided in the ninth hydraulic flow path 219. The eighth valve 238 may be provided as a check valve that allows only a flow of the fluid in the direction of being discharged from the seventh pressure chamber 117 and blocks the flow of the fluid in the opposite direction. That is, the eighth valve 238 may allow the hydraulic pressure generated in the second hydraulic circuit 202 to be transferred to the seventh hydraulic flow path 217 while preventing the fluid flowing in the opposite direction from leaking to the second hydraulic circuit 202 through the ninth hydraulic flow path 219.

The tenth hydraulic flow path 220 may be provided such that the eighth hydraulic flow path 218 and the fifth hydraulic flow path 215 join therein and to be connected to the first hydraulic circuit 201, and the eleventh hydraulic flow path 221 may be provided such that the ninth hydraulic flow path 219 and the second hydraulic flow path 212 join therein and to be connected to the second hydraulic circuit 202.

In this case, when a technical problem occurs in the first electronic control unit 310, the second valve 232 may be maintained in a closed state to block the flow of the fluid that is transferred along the first and second wheel cylinders 41 and 42, so that the fluid discharged from the first pressure chamber 112 may be only transferred to the third and fourth wheel cylinders 43 and 44 through the sixth valve 236 opened in response to the signal from the second electronic control unit 320. Similarly, when a technical problem occurs in the second electronic control unit 320, the sixth valve 236 may be closed to block the flow of fluid that is transferred along the third and fourth wheel cylinders 43 and 44, so that the fluid discharged from the first pressure chamber 112 may be only transferred to the first and second wheel cylinders 41 and 42 through the second valve 232 opened by the first electronic control unit 310.

In a normal braking operation, by the arrangement of hydraulic flow paths and valves as described above, the hydraulic pressure generated in the first pressure chamber 112 according to the forward movement of the hydraulic piston 114 may be transferred to the second hydraulic circuit 202 by sequentially passing through the first hydraulic flow path 211, the second hydraulic flow path 212, and the eleventh hydraulic flow path 221, and may be transferred to the first hydraulic circuit 201 by sequentially passing through the first hydraulic flow path 211, the second hydraulic flow path 212, the twelfth hydraulic flow path 222, the fifth hydraulic flow path 215, and the tenth hydraulic flow path 220. Also, the hydraulic pressure generated in the second pressure chamber 113 according to the backward movement of the hydraulic piston 114 may be transferred to the first hydraulic circuit 201 by sequentially passing through the fourth hydraulic flow path 214, the fifth hydraulic flow path 215, and the tenth hydraulic flow path 220, and may be transferred to the second hydraulic circuit 202 by sequentially passing through the fourth hydraulic flow path 214, the fifth hydraulic flow path 215, the twelfth hydraulic flow path 222, the second hydraulic flow path 212, and the eleventh hydraulic flow path 221.

Conversely, in a normal braking release operation, the negative pressure generated in the first pressure chamber 112 according to the backward movement of the hydraulic piston 114 may recover the hydraulic pressure or fluid in the first hydraulic circuit 201 and the second hydraulic circuit 202 to the first pressure chamber 112. Specifically, when the seventh valve 237 is opened, the hydraulic pressure in the first hydraulic circuit 201 may be transferred to the first pressure chamber 112 by sequentially passing through the tenth hydraulic flow path 220, the eighth hydraulic flow path 218, the seventh hydraulic flow path 217, the third hydraulic flow path 213, and the first hydraulic flow path 211, and the hydraulic pressure in the second hydraulic circuit 202 may be transferred to the first pressure chamber 112 by sequentially passing through the eleventh hydraulic flow path 221, the ninth hydraulic flow path 219, the seventh hydraulic flow path 217, the third hydraulic flow path 213, and the first hydraulic flow path 211. Also, the negative pressure generated in the second pressure chamber 113 according to the forward movement of the hydraulic piston 114 may recover the hydraulic pressure or fluid in the first hydraulic circuit 201 and the second hydraulic circuit 202 to the second pressure chamber 113. Specifically, when the third valve 23 is opened, the hydraulic pressure in the first hydraulic circuit 201 may be transferred to the second pressure chamber 113 by sequentially passing through the tenth hydraulic flow path 220, the eighth hydraulic flow path 218, the seventh hydraulic flow path 217, the sixth hydraulic flow path 216, and the fourth hydraulic flow path 214, and the hydraulic pressure in the second hydraulic circuit 202 may be transferred to the second pressure chamber 113 by sequentially passing through the eleventh hydraulic flow path 221, the ninth hydraulic flow path 219, the seventh hydraulic flow path 217, the sixth hydraulic flow path 216, and the fourth hydraulic flow path 214.

In this case, the first hydraulic unit 271 of the first hydraulic circuit 201 may control the hydraulic pressure in the first and second wheel cylinders 41 and 42, which are two wheel cylinders among the four wheels RR, RL, FR, and FL, and the second hydraulic unit 272 of the second hydraulic circuit 202 may control the hydraulic pressure in the third and fourth wheel cylinders 43 and 44, which are the other two wheel cylinders.

The first hydraulic circuit 201 may be provided to receive the hydraulic pressure through the tenth hydraulic flow path 220, and the tenth hydraulic flow path 220 may be provided to be branched into two flow paths connected to the first wheel cylinder 41 and the second wheel cylinder 42. Also, the first hydraulic circuit 201 may be provided to discharge the hydraulic pressure through the eighth hydraulic flow path 218 and may be provided such that two flow paths join from the first wheel cylinder 41 and the second wheel cylinder 42 toward the eighth hydraulic flow path 218. The second hydraulic circuit 202 may be provided to receive the hydraulic pressure from the hydraulic pressure supply device 100 through the eleventh hydraulic flow path 221, and the eleventh hydraulic flow path 221 may be provided to be branched into two flow paths connected to the third wheel cylinder 43 and the fourth wheel cylinder 44. Also, the second hydraulic circuit 202 may be provided to discharge the hydraulic pressure through the ninth hydraulic flow path 219 and may be provided such that two flow paths join from the third wheel cylinder 43 and the fourth wheel cylinder 44 toward the ninth hydraulic flow path 219.

The first and second hydraulic unit 271 and 272 included in the first and second hydraulic circuits 201 and 202 may include first to fourth inlet valves (291: 291a, 291b, 291c, and 291d) to control the flow of the fluid and the hydraulic pressure that are transferred to the first to fourth wheel cylinders 41, 42, 43, and 44, respectively. The first to fourth inlet valves 291a, 291b, 291c, and 291d are disposed on an upstream side of the first to fourth wheel cylinders 41, 42, 43, and 44, respectively and may be provided as normally open type solenoid valves operated by the first and second electronic control units 310 and 320 in a normally open state. More specifically, the first and second inlet valves 291a and 291b are operated to close when receiving a signal from the first electronic control unit 310, and the third and fourth inlet valves 291c and 291d are operated to close when receiving a signal from the second electronic control unit 320.

The first and second hydraulic units 271 and 272 included in the first and second hydraulic circuits 201 and 202 may include first to fourth check valves 293a, 293b, 293c, and 293d provided to be connected in parallel to the first to fourth inlet valves 291a, 291b, 291c, and 291d. The first to fourth check valves 293a, 293b, 293c, and 293d may be provided in bypass flow paths connecting front and rear sides of the first to fourth inlet valves 293a, 293b, 293c, and 293d on the first and second hydraulic circuits 201 and 202, and may only allow the flow of the fluid from the respective wheel cylinders to the hydraulic pressure providing unit 110 and may block the flow of the fluid from the hydraulic pressure providing unit 110 to the wheel cylinders. The first to fourth check valves 293a, 293b, 293c, and 293d may quickly release the hydraulic pressure of the fluid applied to the respective wheel cylinders, and even when the first to fourth inlet valves 291a, 291b, 291c, and 291d do not operate normally, the hydraulic pressure of the fluid applied to the wheel cylinders may be smoothly returned to the hydraulic pressure providing unit 110.

The first hydraulic unit 271 may include the first cut valves 292a and 292b connected to the first backup flow path 251 to improve performance in the braking release of the first and second wheel cylinders 41 and 42. The first cut valves 292a and 292b are connected to the first and second wheel cylinders 41 and 42, respectively, to control the flow of the fluid discharged from the wheel cylinders. That is, the first cut valves 292a and 292b may control a depressurization in the wheel cylinders by being selectively opened when a depressurization braking such as an ABS dump mode is required by detecting the braking pressure of the first and second wheel cylinders 41 and 42. The fluid discharged to the first backup flow path 251 through the first cut valves 292a and 292b may be transferred to the reservoir 30 through the simulation chamber 22a and the simulation flow path 61. The first cut valves 292a and 292b may be provided as normally open type solenoid valves that close the first backup flow path 251 by closing when a signal is received from the first electronic control unit 310 in a normally open state. Reference numerals 295 and 296 refer to a bypass flow path 295 and a check valve 296 connected in parallel to the first cut valve 292a for smooth connection between the first hydraulic circuit 201 and the first backup flow path 251.

The second hydraulic unit 272 may include first and second outlet valves 292c and 292d directly connected to the reservoir 30 to improve performance in the braking release of the third and fourth wheel cylinders 43 and 44. The first and second outlet valves 292c and 292d are connected to the third and fourth wheel cylinders 43 and 44, respectively, to control the flow of the fluid discharged from the wheel cylinders 43 and 44. That is, the first and second outlet valves 292c and 292d may control the depressurization of the wheel cylinders by being selectively opened when the depressurization braking such as the ABS dump mode is required by detecting the braking pressure of the third and fourth wheel cylinders 43 and 44. The first and second outlet valves 292c and 292d may be provided as normally closed type solenoid valves that operate to be opened when a signal is received from the second electronic control unit 320 in a normally closed state.

The electronic brake system 1 according to the present embodiment may include the first and second backup flow paths 251 and 252 capable of performing braking by directly supplying the fluid discharged from the integrated master cylinder 20 to the wheel cylinders when the normal operation is impossible due to a device failure or the like. A mode in which the hydraulic pressure in the integrated master cylinder 20 is directly transferred to the wheel cylinders is referred to as a fallback mode.

The first backup flow path 251 may be provided to connect the simulation chamber 22a of the master cylinder 20 and the first hydraulic circuit 201, and the second backup flow path 252 may be provided to connect the first master chamber 23a of the master cylinder 20 and the second hydraulic circuit 202. The auxiliary backup flow path 253 may auxiliary connect the simulation chamber 22a and the first hydraulic circuit 201 by the second chamber 24a and the first backup flow path 251 communicating with each other.

Specifically, the first backup flow path 251 may be connected to at least one of rear ends of the first cut valve 292a and the first cut valve 292b on the first hydraulic circuit 201, and the second backup flow path 252 may be connected to at least one of rear ends of the third inlet valve 291c and the fourth inlet valve 291d on the second hydraulic circuit 202. FIG. 5 illustrates that the first backup flow path 251 is branched to be connected to the rear ends of the first cut valve 292a and the first cut valve 292b, respectively, and the second backup flow path 252 is connected to the rear end of the fourth inlet valve 291d, but the present disclosure is not limited thereto, and as long as the first backup flow path 251 may be branched to be connected to at least one of the rear ends of the first cut valve 292a and the first cut valve 292b, and the second backup flow path 252 may be connected to at least one of the rear ends of the third inlet valve 291c and the fourth inlet valve 291d, it should be understood to be the same.

As described above, the first cut valves 292a and 292b may be provided as normally open type solenoid valves that close the first backup flow path 251 by closing when a signal is received from the first electronic control unit 310 in a normally open state. In addition, the second cut valve 262 for controlling a flow of the fluid in both directions may be provided in the second backup flow path 252. The second cut valve 262 may be provided as a normally open type solenoid valve that operates to close when a closing signal is received from the second electronic control unit 320 in a normally open state.

Accordingly, when the first cut valves 292a and 292b and the second cut valve 262 are closed, the fluid in the master cylinder 20 may be prevented from being directly transferred to the wheel cylinders 41, 42, 43, and 44, and at the same time the hydraulic pressure provided from the hydraulic pressure supply device 100 may be supplied to the wheel cylinders through the first and second hydraulic circuits 201 and 202, and when the first cut valves 292a and 292b and the second cut valve 262 are opened, the fluid pressurized in the master cylinder 20 may be directly supplied to the wheel cylinders 41, 42, 43, and 44 through the first and second backup flow paths 251 and 252, thereby performing the braking.

The electronic brake system 1 according to the present embodiment may include a first pressure sensor PS1 to detect a hydraulic pressure in at least one of the first hydraulic circuit 201 and the second hydraulic circuit 202, and a second pressure sensor PS2 to detect a hydraulic pressure in the master cylinder 20. The drawing illustrates that the first pressure sensors PS1 are provided at front ends of the inlet valves 291 in the first hydraulic circuit 201 and the second hydraulic circuit 202 to detect the hydraulic pressure of the fluid applied to the first hydraulic circuit 201 and the second hydraulic circuit 202, and the second pressure sensor PS2 detects a hydraulic pressure of the fluid generated in the first master chamber 23a, but the pressure sensors are not limited to the above positions and numbers, and as long as the hydraulic pressures in the hydraulic circuits 201 and 202 and the master cylinder 20 may be detected, the pressure sensors may be provided in various positions and as various numbers.

Hereinafter, methods of operating the electronic brake system 1 according to the present embodiment will be described.

The operation of the electronic brake system 1 according to the present embodiment may perform the normal operation mode in which various devices and valves operate normally without failure or malfunction, a first abnormal operation mode (fallback mode) in which the first and second electronic control units 310 and 320, various devices and valves operate abnormally by failure or malfunction, a second abnormal operation mode in which the first electronic control unit 310 operates normally and the second electronic control unit 320 operates abnormally, a third abnormal operation mode in which the first electronic control unit 310 operates abnormally and the second electronic control unit 320 operates normally, an ABS dump mode in which the hydraulic pressure in the wheel cylinder is rapidly and continuously depressurized for ABS operation, and a diagnostic mode for checking whether the master cylinder 20 has a leak.

First, the normal operation mode among the operating methods of the electronic brake system 1 according to the present embodiment will be described.

FIG. 6 is a hydraulic circuit diagram illustrating an operation of providing a hydraulic pressure when the electronic brake system according to the first embodiment of the present disclosure is normally operated, and FIG. 7 is a hydraulic circuit diagram illustrating an operation of providing a hydraulic pressure in the first abnormal operation mode (fallback mode) when the electronic brake system according to the first embodiment of the present disclosure is abnormally operated.

Referring to FIG. 6, when the driver depresses the brake pedal 10 to performing braking, the motor 120 operates to rotate in one direction, a rotational force of the motor 120 is transferred to the hydraulic pressure providing unit 110 by the power conversion unit 130, and the hydraulic piston 114 of the hydraulic pressure providing unit 110 moves forward, thereby generating a hydraulic pressure in the first pressure chamber 112. The hydraulic pressure discharged from the first pressure chamber 112 is transferred to the respective wheel cylinders 41, 42, 43, and 44 through the first hydraulic circuit 201 and the second hydraulic circuit 202, thereby generating a braking force.

Specifically, the hydraulic pressure generated in the first pressure chamber 112 is primarily transferred to the wheel cylinders 41 and 42 provided in the first hydraulic circuit 201 by sequentially passing through the first hydraulic flow path 211, the second hydraulic flow path 212, the twelfth hydraulic flow path 222, the fifth hydraulic flow path 215, and the tenth hydraulic flow path 220. At this time, the first inlet valve 291a and the second inlet valve 291b provided in the first hydraulic circuit 201 are provided in the open state, and the first cut valve 292a and the first cut valve 292b are maintained in the closed state, so that the hydraulic pressure is prevented from leaking.

Also, the hydraulic pressure generated in the first pressure chamber 112 is primarily transferred to the wheel cylinders 43 and 44 provided in the second hydraulic circuit 202 by sequentially passing through the first hydraulic flow path 211, the second hydraulic flow path 212, and the eleventh hydraulic flow path 221. At this time, the third inlet valve 291c and the fourth inlet valve 291d provided in the second hydraulic circuit 202 are provided in the open state, and the first outlet valve 292c and the second outlet valve 292d are maintained in the closed state, so that the hydraulic pressure is prevented from leaking.

As described above, the fifth valve 235 allows the flow of the fluid in the direction of being discharged from the first pressure chamber 112, so that the fluid may be transferred from the first pressure chamber 112 to the eleventh hydraulic flow path 221. Also, the second valve 232 allows the flow of the fluid from the twelfth hydraulic flow path 222 toward the second hydraulic circuit 202, and the sixth valve 236 allows the flow of the fluid from the twelfth hydraulic flow path 222 toward the first hydraulic circuit 201, so that in the normal operation mode, the hydraulic pressure generated in the first pressure chamber 112 by the forward movement of the hydraulic piston 114 may be stably provided to the first hydraulic circuit 201 and the second hydraulic circuit 202. At this time, the first dump valve 241 may be maintained in the closed state, so that the hydraulic pressure generated in the first pressure chamber 112 is prevented from leaking to the reservoir 30.

When an additional braking hydraulic pressure is required during the braking operation, or when an initial position of the hydraulic piston 114 is moved forward, as the hydraulic piston 114 of the hydraulic pressure providing unit 110 moves backward, a hydraulic pressure may be generated in the second pressure chamber 113. That is, the hydraulic pressure providing unit 110 may provide an additional hydraulic pressure as the hydraulic piston 114 repeats the forward and backward movements.

Specifically, the hydraulic pressure generated in the second pressure chamber 113 is primarily transferred to the wheel cylinders 41 and 42 provided in the first hydraulic circuit 201 by sequentially passing through the fourth hydraulic flow path 214, the fifth hydraulic flow path 215, and the tenth hydraulic flow path 220. At this time, the first inlet valve 291a and the second inlet valve 291b provided in the first hydraulic circuit 201 are provided in the open state, and the first cut valve 292a and the first cut valve 292b are maintained in the closed state, so that the hydraulic pressure is prevented from leaking.

Also, the hydraulic pressure generated in the second pressure chamber 113 is primarily transferred to the wheel cylinders 43 and 44 provided in the second hydraulic circuit 202 by sequentially passing through the fourth hydraulic flow path 214, the fifth hydraulic flow path 215, the twelfth hydraulic flow path 222, the second hydraulic flow path 212, and the eleventh hydraulic flow path 221. At this time, the third inlet valve 291c and the fourth inlet valve 291d provided in the second hydraulic circuit 202 are provided in the open state, and the first outlet valve 292c and the second outlet valve 292d are maintained in the closed state, so that the hydraulic pressure is prevented from leaking.

In addition, in the normal operation mode in which the braking of the wheel cylinders 41, 42, 43, and 44 is performed by the hydraulic pressure supply device 100, the first and second backup flow paths 251 and 252 are closed to prevent the fluid discharged from the master cylinder 20 from being transferred to the wheel cylinders 41, 42, 43 and 44. That is, the first cut valve 292a and the first cut valve 292b are switched to the closed state by the first electronic control unit 310, and the second cut valve 262 is switched to the closed state by the second electronic control unit 320. In addition, because the simulator valve 70 provided in the simulation flow path 61 is opened so that the simulation chamber 22a and the reservoir 30 are in communication with each other, the fluid accommodated in the simulation chamber 22a is supplied to the reservoir 30 through the simulation flow path 61, and the simulation piston 22 smoothly moves forward by the pressing force of the brake pedal 10 to generate a displacement. As such, as the simulation piston 22 moves forward in a state in which the positions of the first master piston 23 and the second master piston 24 are fixed, the elastic member 25 disposed between the simulation piston 22 and the first master piston 23 is compressed, and a reaction force corresponding to the pressing force of the brake pedal 10 acts by the elastic restoring force of the compressed elastic member 25, thereby providing a stable and proper pedal feel to the driver.

Thereafter, when the ABS dump mode is to be performed, the second electronic control unit 320 repeatedly opens and closes the first outlet valve 292c and the second outlet valve 292d, so that the hydraulic pressure of the fluid applied to the third wheel cylinder 43 and the fourth wheel cylinder 44 may be released directly to the reservoir 30. Also, the first electronic control unit 310 repeatedly opens and closes the first cut valve 292a and the first cut valve 292b, so that the hydraulic pressure of the fluid applied to the first wheel cylinder 41 and the second wheel cylinder 42 may be released to the reservoir 30 by sequentially passing through the first backup flow path 251, the simulation chamber 22a, and the simulation flow path 61.

In the electronic brake system 1 according to the present embodiment, the flow path pressure sensor PS1 provided to detect a hydraulic pressure in at least one of the first hydraulic circuit 201 and the second hydraulic circuit 202 may detect the hydraulic pressure transferred to the wheel cylinders 41, 42, 43, and 44, and may control the operation of the hydraulic pressure supply device 100 based on the detected hydraulic pressure to control the flow rate or hydraulic pressure of the fluid transferred to the wheel cylinders 41, 42, 43, and 44. In addition, when the hydraulic pressure transferred to the wheel cylinders 41, 42, 43, and 44 is higher than a target pressure value by the pressing force of the brake pedal 10, the flow path pressure sensor PS1 may open at least one of the first to second outlet valves 292a, 292b, 292c, and 292d to control the hydraulic pressure to correspond to the target pressure value.

In addition, the electronic brake system 1 according to the present embodiment may perform the diagnostic mode for checking whether the master cylinder 20 has a leak. When performing the diagnostic mode, the first and second electronic control units 310 and 320 control to supply the hydraulic pressure generated from the hydraulic pressure supply device 100 to the master chamber of the master cylinder 20.

Specifically, in a state in which each of the valves is controlled to be in an initial braking state which is a non-operating state, the first and second electronic control units 310 and 320 operate to move the hydraulic piston 114 forward to generate a hydraulic pressure in the first pressure chamber 112, and at the same time the second electronic control unit 320 controls the second cut valve 262 to be in the closed state. That is, the first master chamber 23a is provided in a sealed state. The hydraulic pressure generated in the first pressure chamber 112 is transferred to the first hydraulic circuit 201 by sequentially passing through the first hydraulic flow path 211, the second hydraulic flow path 212, the twelfth hydraulic flow path 222, the fifth hydraulic flow path 215, and the tenth hydraulic flow path 220, and the first cut valve 292a and the first cut valve 292b are maintained in the normally open state, so that the fluid transferred to the first hydraulic circuit 201 is transferred to the simulation chamber 22a through the first backup flow path 251. At this time, the simulator valve 70 is maintained in the closed state so that the simulation chamber 22a is provided in the sealed state.

In this state, by comparing a hydraulic pressure value of the fluid expected to be generated by the displacement of the hydraulic piston 114 with an inner pressure of the master cylinder 20 measured by the second pressure sensor PS2, a leak of the master cylinder 20 may be diagnosed. Specifically, a hydraulic pressure value of the first pressure chamber 112 calculated and predicted based on a displacement amount of the hydraulic piston 114 or a rotational angle measured by the motor control sensor MPS is compared with an actual hydraulic pressure value of the master cylinder 20 measured by the second pressure sensor PS2, and when both the hydraulic pressure values coincide, it may be determined that there is no leak in the master cylinder 20. On the contrary, because when the actual hydraulic pressure value of the master cylinder 20 measured by the second pressure sensor PS2 is lower than the hydraulic pressure value of the first pressure chamber 112 calculated and predicted based on the displacement amount of the hydraulic piston 114 or the rotational angle measured by the motor control sensor MPS, a part of the hydraulic pressure of the fluid applied to the simulation chamber 22a is lost, it may be determined that a leak occurs in the master cylinder 20, and the leak may be notified to the driver.

Hereinafter, an operation method in the first abnormal operation mode in which the electronic brake system 1 according to the first embodiment of the present disclosure does not operate normally, that is, in the fallback mode will be described.

Referring to FIG. 7, in the first abnormal operation mode, each of the valves is controlled to be in the initial braking state which is a non-operating state. At this time, when the driver depresses the brake pedal 10, the simulation piston 22 connected to the brake pedal 10 moves forward. Because the simulator valve 70 is in the closed state, the simulation chamber 22a is sealed to move the first master piston 23 and the second master piston 24 forward without compressing the elastic member 25.

In the non-operating state, because the second cut valve 262 and the first cut valves 292a and 292b are maintained in the open state, the fluid accommodated in the simulation chamber 22a by the forward movement of the simulation piston 22 is transferred to the first hydraulic circuit 201 along the first backup flow path 251, the fluid accommodated in the first master chamber 23a by the forward movement of the first master piston 23 is transferred to the second hydraulic circuit 202 along the second backup flow path 252, and the fluid accommodated in the second master chamber 24a by the forward movement of the second master piston 24 is joined in the first backup flow path 251 along the auxiliary backup flow path 253 and transferred to the first hydraulic circuit 201, thereby performing the braking of the wheel cylinders 41, 42, 43, and 44.

In the non-operating state, that is, in a state in which a signal is not received from the first electronic control unit 310, the first cut valves 292a and 292b, and the first and second inlet valves 291a and 291b provided in the first hydraulic circuit 201 are in the open state, and the simulator valve 70 is in the closed state, and in a state in which a signal is not received from the second electronic control unit 320, the second cut valve 262, and the third and fourth inlet valves 291c and 291d provided in the second hydraulic circuit 202 are in the open state, and the first and second outlet valves 292c and 292d are in the closed state. Accordingly, the hydraulic pressure generated in the simulation chamber 22a, the first master chamber 23a, and the second master chamber 24a of the master cylinder 20 may be directly transferred to the wheel cylinders 41, 42, 43, and 44, thereby improving the braking stability and performing a quick braking.

Hereinafter, a case in which one of the first electronic control unit 310 and the second electronic control unit 320 of the electronic brake system 1 according to the first embodiment of the present disclosure operates normally and the other operates abnormally, that is, operations in the second and third abnormal modes will be described.

FIG. 8 is a hydraulic circuit diagram illustrating a braking operation in a second abnormal operation mode of the electronic brake system according to the first embodiment of the present disclosure, and FIG. 9 is a hydraulic circuit diagram illustrating a braking release operation in the second abnormal operation mode of the electronic brake system according to the first embodiment of the present disclosure.

When the first electronic control unit 310 operates abnormally and the second electronic control unit 320 operates normally, the valves controlled by the first electronic control unit 310 are controlled to be in the initial braking state which is a non-operating state, and the valves controlled by the second electronic control unit 320 operate normally.

First, a braking operation when the first electronic control unit 310 operates abnormally and the second electronic control unit 320 operates normally will be described with reference to FIG. 8.

When the driver applies a pressing force to the brake pedal 10, the simulator valve 70, the second valve 232, and the third valve 233 controlled by the first electronic control unit 310 are maintained in the closed state, and the first and second inlet valves 291a and 291b and the first cut valves 292a and 292b are maintained in the open state (initial state). At the same time, the second cut valve 262, the seventh valve 237, the first dump valve 241, and the first and second outlet valves 292c and 292d controlled by the second electronic control unit 320 are maintained in the closed state, and the sixth valve 236 and the third and fourth inlet valves 291c and 291d are maintained in the open state.

In this state, the simulation piston 22 connected to the brake pedal 10 moves forward, but because the first master chamber 23a is sealed, the elastic member 25 is compressed. At this time, because the simulator valve 70 is closed and the first cut valves 292a and 292b are open, the fluid accommodated in the simulation chamber 22a is transferred to the first hydraulic circuit 201 along the first backup flow path 251 to perform the braking of the wheel cylinders 41 and 42. Also, the fluid accommodated in the second master chamber 24a may be transferred to the first hydraulic circuit 201 along the auxiliary backup flow path 253 and the first backup flow path 251 to perform the braking of the wheel cylinders 41 and 42.

At the same time, the hydraulic pressure supply device 100 controlled by the second electronic control unit 320 is operable to generate a hydraulic pressure in the first pressure chamber 112 while the hydraulic piston 114 moves forward. Accordingly, the hydraulic pressure generated in the first pressure chamber 112 is transferred to the wheel cylinders 43 and 44 provided in the second hydraulic circuit 202 by sequentially passing through the first hydraulic flow path 211, the second hydraulic flow path 212, and the eleventh hydraulic flow path 221. At this time, the sixth valve 236, and the third and fourth inlet valves 291c and 291d controlled by the normally operating second electronic control unit 320 are provided in the open state, and the first and second outlet valves 292c and 292d are maintained in the closed state, thereby providing a stable braking pressure and preventing the hydraulic pressure from leaking.

Next, a braking release operation when the first electronic control unit 310 operates abnormally and the second electronic control unit 320 operates normally will be described with reference to FIG. 9.

When the driver releases the pressing force applied to the brake pedal 10, the seventh valve 237 controlled by the second electronic control unit 320 is switched from the closed state to the open state.

When the pressing force applied to the brake pedal 10 is released, the simulation piston 22 moves backward by the elastic force of the simulator spring 22b and the elastic member 25 to generate a negative pressure in the simulation chamber 22a. Accordingly, the fluid in the wheel cylinders 41 and 42 provided in the first hydraulic circuit 201 is transferred to the simulation chamber 22a along the first backup flow path 251. Also, a part of the fluid transferred along the first backup flow path 251 may be transferred to the second master chamber 24a through the auxiliary backup flow path 253 to assist in hydraulic pressure relief. That is, the braking hydraulic pressure in the wheel cylinders 41 and 42 provided in the first hydraulic circuit 201 is eliminated.

At the same time, the hydraulic pressure supply device 100 controlled by the second electronic control unit 320 is operable to generate a negative pressure in the first pressure chamber 112 while the hydraulic piston 114 moves backward. Accordingly, the fluid in the wheel cylinders 43 and 44 provided in the second hydraulic circuit 202 is transferred to the first pressure chamber 112 by sequentially passing through the eleventh hydraulic flow path 221, the ninth hydraulic flow path 219, the seventh hydraulic flow path 217, the third hydraulic flow path 213, and the first hydraulic flow path 211. That is, the braking hydraulic pressure in the wheel cylinders 43 and 44 provided in the second hydraulic circuit 202 is eliminated.

FIG. 10 is a hydraulic circuit diagram illustrating a braking operation in a third abnormal operation mode of the electronic brake system according to the first embodiment of the present disclosure, and FIG. 11 is a hydraulic circuit diagram illustrating a braking release operation in the third abnormal operation mode of the electronic brake system according to the first embodiment of the present disclosure.

When the second electronic control unit 320 operates abnormally and the first electronic control unit 310 operates normally, the valves controlled by the second electronic control unit 320 are controlled to be in the initial braking state which is a non-operating state, and the valves controlled by the first electronic control unit 310 operate normally.

First, a braking operation when the second electronic control unit 320 operates abnormally and the first electronic control unit 310 operates normally will be described with reference to FIG. 10.

When the driver applies a pressing force to the brake pedal 10, the second cut valve 262, and the third and fourth inlet valves 291c and 291d controlled by the second electronic control unit 320 are maintained in the open state, and the six valve 236, the seventh valve 237, and the first and second outlet valves 292c and 292d are maintained in the closed state (initial state). At the same time, the simulator valve 70, the second valve 232, and the first and second inlet valves 291a and 291b controlled by the first electronic control unit 310 are maintained in the open state, and the third valve 233, the second dump valve 242, and the first cut valves 292a and 292b are maintained in the closed state.

In this state, when the simulation piston 22 connected to the brake pedal 10 moves forward, the simulator valve 70 is opened and the first cut valves 292a and 292b are closed, so that the fluid accommodated in the simulation chamber 22a is transferred to the reservoir 30 along the simulation flow path 61. At this time, because the second cut valve 262 is opened and the first and second outlet valves 292c and 292d are closed, the fluid accommodated in the first master chamber 23a is transferred to the second hydraulic circuit 202 along the second backup flow path 252 to perform the braking of the wheel cylinders 43 and 44.

At the same time, the hydraulic pressure supply device 100 controlled by the first electronic control unit 310 is operable to generate a hydraulic pressure in the second pressure chamber 113 while the hydraulic piston 114 moves backward. Accordingly, the hydraulic pressure generated in the second pressure chamber 113 is transferred to the wheel cylinders 41 and 42 provided in the first hydraulic circuit 201 by sequentially passing through the fourth hydraulic flow path 214, the fifth hydraulic flow path 215, and the tenth hydraulic flow path 220. At this time, the second valve 232, and the first and second inlet valves 291a and 291b controlled by the normally operating first electronic control unit 310 are provided in the open state, and the first cut valves 292a and 292b are maintained in the closed state, thereby providing a stable braking pressure and preventing the hydraulic pressure from leaking.

Next, a braking release operation when the second electronic control unit 320 operates abnormally and the first electronic control unit 310 operates normally will be described with reference to FIG. 11.

When the driver releases the pressing force applied to the brake pedal 10, the third valve 233 controlled by the first electronic control unit 310 is switched from the closed state to the open state.

When the pressing force applied to the brake pedal 10 is released, the simulation piston 22 moves backward by the elastic force of the simulator spring 22b and the elastic member 25 to generate a negative pressure in the simulation chamber 22a and the first master chamber 23a. Accordingly, the fluid in the wheel cylinders 43 and 44 provided in the second hydraulic circuit 202 is transferred to the first master chamber 23a along the second backup flow path 252. That is, the braking hydraulic pressure in the wheel cylinders 41 and 42 provided in the first hydraulic circuit 201 is eliminated. Also, the fluid in the reservoir 30 is transferred to the simulation chamber 22a along the simulation flow path 61.

At the same time, the hydraulic pressure supply device 100 controlled by the first electronic control unit 310 is operable to generate a negative pressure in the second pressure chamber 113 while the hydraulic piston 114 moves forward. Accordingly, the fluid in the wheel cylinders 41 and 42 provided in the first hydraulic circuit 201 is transferred to the second pressure chamber 113 by sequentially passing through the tenth hydraulic flow path 220, the eighth hydraulic flow path 218, the seventh hydraulic flow path 217, the sixth hydraulic flow path 216, and the fourth hydraulic flow path 214. That is, the braking hydraulic pressure in the wheel cylinders 41 and 42 provided in the first hydraulic circuit 201 is eliminated.

As described above, in the electronic brake system 1 according to the first embodiment of the present disclosure, stable braking and braking release operations are possible even in the normal operation mode, the first abnormal operation mode, and the second and third abnormal operation modes in which any one of the first and second electronic control units 310 and 320 is in an abnormal state.

Hereinafter, the electronic brake system 1 according to a second embodiment of the present disclosure will be described.

In the electronic brake system 1 according to the second embodiment of the present disclosure, contents overlapping with the electronic brake system 1 according to the first embodiment described above will be omitted, and only different contents will be described.

FIG. 12 is a hydraulic circuit diagram illustrating an electronic brake system according to a second embodiment of the present disclosure.

Referring to FIG. 12, the electronic brake system 1 according to the second embodiment of the present disclosure includes the simulation chamber 22a, the simulation piston 22 connected to the brake pedal 10 and provided in the simulation chamber 22a, the first master chamber 23a, and the first master piston 23 provided in the first master chamber 23a to be displaceable by a displacement of the simulation piston 22 or a hydraulic pressure in the simulation chamber 22a, and the master cylinder 20 including the elastic member 25 provided between the simulation piston 22 and the first master piston.

That is, compared with the master cylinder 20 according to the first embodiment, in the master cylinder 20 according to the second embodiment of the present disclosure, the second master piston 24, the second master chamber 24a, and the second piston spring 24b are excluded, and thus the auxiliary backup flow path 253 and the second reservoir flow path 63 are not provided. In addition, although the reservoir bypass flow path 64 and the check valve 71 are excluded in the present embodiment, they do not need to be excluded and should be understood in the same way.

Other components other than the master cylinder 20, such as the hydraulic pressure supply device 100 and the hydraulic control unit 270, should be understood in the same manner as in the first embodiment, and descriptions will be omitted to prevent duplicate contents.

Hereinafter, an operation method of the electronic brake system 1 according to the second embodiment of the present disclosure will be described.

FIG. 13 is a hydraulic circuit diagram illustrating an operation of providing a hydraulic pressure when the electronic brake system according to the second embodiment of the present disclosure is normally operated, and FIG. 14 is a hydraulic circuit diagram illustrating an operation of providing a hydraulic pressure in a first abnormal operation mode (fallback mode) when the electronic brake system according to the second embodiment of the present disclosure is abnormally operated.

Referring to FIG. 13, because components of the electronic brake system 1 according to the second embodiment of the present disclosure are the same as the components of the electronic brake system 1 according to the first embodiment except that the second master piston 24 is excluded, a normal braking operation of the electronic brake system 1 according to the second embodiment may be understood as the same as the normal braking operation of the electronic brake system 1 according to the first embodiment described above, and a description thereof will be omitted.

Referring to FIG. 14, in an abnormal operation mode, each of the valves is controlled to be in an initial braking state, which is the non-operational state. At this time, when the driver applies a pressing force to the brake pedal 10, the simulation piston 22 connected to the brake pedal 10 moves forward. Because the simulator valve 70 is in the closed state, the simulation chamber 22a is sealed to move the first master piston 23 forward without compressing the elastic member 25.

Because the second cut valve 262 and the first cut valves 292a and 292b are maintained in the open state in the non-operational state, the fluid accommodated in the simulation chamber 22a by the forward movement of the simulation piston 22 is transferred to the first hydraulic circuit 201 along the first backup flow path 251, and the fluid accommodated in the first master chamber 23a by the forward movement of the first master piston 23 is transferred to the second hydraulic circuit 202 along the second backup flow path 252, thereby performing the braking of the wheel cylinders 41, 42, 43, and 44.

In the abnormal operation, that is, in a state in which a signal is not received from the first electronic control unit 310, the first cut valves 292a and 292b, and the first and second inlet valves 291a and 291b provided in the first hydraulic circuit 201 are in the open state, and the simulator valve 70 is in the closed state, and in a state in which a signal is not received from the second electronic control unit 320, the second cut valve 262, and the third and fourth inlet valves 291c and 291d provided on the second hydraulic circuit 202 are in the open state, and the first and second outlet valves 292c and 292d are in the closed state. Accordingly, the hydraulic pressure generated in the simulation chamber 22a and the first master chamber 23a of the master cylinder 20 may be directly transferred to the wheel cylinders 41, 42, 43, and 44, thereby improving a braking stability and performing a rapid braking.

Hereinafter, a case in which one of the first electronic control unit 310 and the second electronic control unit 320 of the electronic brake system 1 according to the second embodiment of the present disclosure operates normally and the other operates abnormally, that is, an operation in a partially abnormal mode will be described.

FIG. 15 is a hydraulic circuit diagram illustrating a braking operation in a second abnormal operation mode of the electronic brake system according to the second embodiment of the present disclosure, and FIG. 16 is a hydraulic circuit diagram illustrating a braking release operation in the second abnormal operation mode of the electronic brake system according to the second embodiment of the present disclosure.

First, a braking operation when the first electronic control unit 310 operates abnormally and the second electronic control unit 320 operates normally will be described with reference to FIG. 15.

When the driver applies a pressing force to the brake pedal 10, the simulator valve 70, the second valve 232, and the third valve 233 controlled by the first electronic control unit 310 are maintained in the closed state, and the first and second inlet valves 291a and 291b and the first cut valves 292a and 292b are maintained in the open state (initial state). At the same time, the second cut valve 262, the seventh valve 237, the first dump valve 241, and the first and second outlet valves 292c and 292d controlled by the second electronic control unit 320 are maintained in the closed state, and the sixth valve 236 and the third and fourth inlet valves 291c and 291d are maintained in the open state.

In this state, the simulation piston 22 connected to the brake pedal 10 moves forward, but because the first master chamber 23a is sealed, the elastic member 25 is compressed. At this time, because the simulator valve 70 is closed and the first cut valves 292a and 292b are open, the fluid accommodated in the simulation chamber 22a is transferred to the first hydraulic circuit 201 along the first backup flow path 251 to perform the braking of the wheel cylinders 41 and 42.

At the same time, the hydraulic pressure supply device 100 controlled by the second electronic control unit 320 is operable to generate a hydraulic pressure in the first pressure chamber 112 while the hydraulic piston 114 moves forward. Accordingly, the hydraulic pressure generated in the first pressure chamber 112 is transferred to the wheel cylinders 43 and 44 provided in the second hydraulic circuit 202 by sequentially passing through the first hydraulic flow path 211, the second hydraulic flow path 212, and the eleventh hydraulic flow path 221. At this time, the sixth valve 236, and the third and fourth inlet valves 291c and 291d controlled by the normally operating second electronic control unit 320 are provided in the open state, and the first and second outlet valves 292c and 292d are maintained in the closed state, thereby providing a stable braking pressure and preventing the hydraulic pressure from leaking.

Next, a braking release operation when the first electronic control unit 310 operates abnormally and the second electronic control unit 320 operates normally will be described with reference to FIG. 16.

When the driver releases the pressing force applied to the brake pedal 10, the seventh valve 237 controlled by the second electronic control unit 320 is switched from the closed state to the open state.

When the pressing force applied to the brake pedal 10 is released, the simulation piston 22 moves backward by the elastic force of the simulator spring 22b and the elastic member 25 to generate a negative pressure in the simulation chamber 22a. Accordingly, the fluid in the wheel cylinders 41 and 42 provided in the first hydraulic circuit 201 is transferred to the simulation chamber 22a along the first backup flow path 251. That is, the braking hydraulic pressure in the wheel cylinders 41 and 42 provided in the first hydraulic circuit 201 is eliminated.

At the same time, the hydraulic pressure supply device 100 controlled by the second electronic control unit 320 is operable to generate a negative pressure in the first pressure chamber 112 while the hydraulic piston 114 moves backward. Accordingly, the fluid in the wheel cylinders 43 and 44 provided in the second hydraulic circuit 202 is transferred to the first pressure chamber 112 by sequentially passing through the eleventh hydraulic flow path 221, the ninth hydraulic flow path 219, the seventh hydraulic flow path 217, the third hydraulic flow path 213, and the first hydraulic flow path 211. That is, the braking hydraulic pressure in the wheel cylinders 43 and 44 provided in the second hydraulic circuit 202 is eliminated.

FIG. 17 is a hydraulic circuit diagram illustrating a braking operation in a third abnormal operation mode of the electronic brake system according to the second embodiment of the present disclosure, and FIG. 18 is a hydraulic circuit diagram illustrating a braking release operation in the third abnormal operation mode of the electronic brake system according to the second embodiment of the present disclosure.

First, a braking operation when the second electronic control unit 320 operates abnormally and the first electronic control unit 310 operates normally will be described with reference to FIG. 17.

When the driver applies a pressing force to the brake pedal 10, the second cut valve 262, and the third and fourth inlet valves 291c and 291d controlled by the second electronic control unit 320 are maintained in the open state, and the six valve 236, the seventh valve 237, and the first and second outlet valves 292c and 292d are maintained in the closed state (initial state). At the same time, the simulator valve 70, the second valve 232, and the first and second inlet valves 291a and 291b controlled by the first electronic control unit 310 are maintained in the open state, and the third valve 233, the second dump valve 242, and the first cut valves 292a and 292b are maintained in the closed state.

In this state, when the simulation piston 22 connected to the brake pedal 10 moves forward, the simulator valve 70 is opened and the first cut valves 292a and 292b are closed, so that the fluid accommodated in the simulation chamber 22a is transferred to the reservoir 30 along the simulation flow path 61. At this time, because the second cut valve 262 is opened and the first and second outlet valves 292c and 292d are closed, the fluid accommodated in the first master chamber 23a is transferred to the second hydraulic circuit 202 along the second backup flow path 252 to perform the braking of the wheel cylinders 43 and 44.

At the same time, the hydraulic pressure supply device 100 controlled by the first electronic control unit 310 is operable to generate a hydraulic pressure in the second pressure chamber 113 while the hydraulic piston 114 moves backward. Accordingly, the hydraulic pressure generated in the second pressure chamber 113 is transferred to the wheel cylinders 41 and 42 provided in the first hydraulic circuit 201 by sequentially passing through the fourth hydraulic flow path 214, the fifth hydraulic flow path 215, and the tenth hydraulic flow path 220. At this time, the second valve 232, and the first and second inlet valves 291a and 291b controlled by the normally operating first electronic control unit 310 are provided in the open state, and the first cut valves 292a and 292b are maintained in the closed state, thereby providing a stable braking pressure and preventing the hydraulic pressure from leaking.

Next, a braking release operation when the second electronic control unit 320 operates abnormally and the first electronic control unit 310 operates normally will be described with reference to FIG. 18.

When the driver releases the pressing force applied to the brake pedal 10, the third valve 233 controlled by the first electronic control unit 310 is switched from the closed state to the open state.

When the pressing force applied to the brake pedal 10 is released, the simulation piston 22 moves backward by the elastic force of the simulator spring 22b and the elastic member 25 to generate a negative pressure in the simulation chamber 22a and the first master chamber 23a. Accordingly, the fluid in the wheel cylinders 43 and 44 provided in the second hydraulic circuit 202 is transferred to the first master chamber 23a along the second backup flow path 252. That is, the braking hydraulic pressure in the wheel cylinders 41 and 42 provided in the first hydraulic circuit 201 is eliminated. Also, the fluid in the reservoir 30 is transferred to the simulation chamber 22a along the simulation flow path 61.

At the same time, the hydraulic pressure supply device 100 controlled by the first electronic control unit 310 is operable to generate a negative pressure in the second pressure chamber 113 while the hydraulic piston 114 moves forward. Accordingly, the fluid in the wheel cylinders 41 and 42 provided in the first hydraulic circuit 201 is transferred to the second pressure chamber 113 by sequentially passing through the tenth hydraulic flow path 220, the eighth hydraulic flow path 218, the seventh hydraulic flow path 217, the sixth hydraulic flow path 216, and the fourth hydraulic flow path 214. That is, the braking hydraulic pressure in the wheel cylinders 41 and 42 provided in the first hydraulic circuit 201 is eliminated.

Hereinafter, the electronic brake system 1 according to a third embodiment of the present disclosure will be described.

In the electronic brake system 1 according to a third embodiment of the present disclosure, contents overlapping with the electronic brake system 1 according to the first embodiment described above will be omitted, and only different contents will be described.

FIG. 19 is a hydraulic circuit diagram illustrating an electronic brake system according to a third embodiment of the present disclosure.

Referring to FIG. 19, the electronic brake system 1 according to the third embodiment of the present disclosure is not provided with the master cylinder, but includes a simulator connected to the brake pedal 10 to generate a reaction force or pedal feeling against a pressing force.

The simulator includes the cylinder block 21, the simulation chamber 22a provided in the cylinder block 21, the simulation piston 22 connected to the brake pedal 10 to be movable forward and backward in the simulation chamber 22a, and the elastic member 25 provided in the simulation chamber 22a to provide a pedal feeling through an elastic restoring force when a displacement of the simulation piston 22 occurs.

The simulator is provided to be hydraulically separated from the hydraulic control unit 270, the first hydraulic circuit 201, and the second hydraulic circuit 202. Therefore, the simulator may not directly transfer the hydraulic pressure by the brake pedal 10 to the first hydraulic circuit 201 and the second hydraulic circuit 202. However, as described in the first embodiment or the second embodiment, because the two electronic control units 310 and 320 are provided, even when any one of the electronic control units operates abnormally, the other one may operate to perform a stable braking operation.

The first and second backup flow paths 251 and 252 according to the third embodiment of the present disclosure connect the first and second hydraulic circuits 201 and 202, respectively, to the reservoir 30.

The electronic brake system 1 according to the third embodiment of the present disclosure receives a braking force of the driver as a signal from the pedal displacement sensor 11 provided to detect the displacement of the brake pedal 10, and controls to operate the hydraulic pressure supply device 100.

Compared with the hydraulic pressure supply device 100 of the electronic brake system 1 according to the first embodiment described above, the hydraulic pressure supply device 100 that has received the signal of the simulator according to the third embodiment of the present disclosure operates in the same manner in the normal operation mode and in the abnormal operation mode in any one of the first and second electronic control units 310 and 320.

In the third embodiment of the present disclosure, because the master cylinder is not provided, and the simulator is provided to be hydraulically separated from the hydraulic control unit 270, the first hydraulic circuit 201, and the second hydraulic circuit 202, the electronic control units 310 and 320 may not perform the braking operation in a completely abnormal operation, but because the two electronic control units 310 and 320 are provided, even when any one of the electronic control units operates abnormally, the other one may operate to perform a stable braking operation.

Therefore, it should be understood that the operations of the electronic brake system 1 according to the third embodiment of the present disclosure in the normal operation mode, the abnormal operation mode in any one of the first and second electronic control units 310 and 320 are the same as the operations of the electronic brake system 1 according to the first embodiment described above.

The invention claimed is:

1. An electronic brake system comprising:
a reservoir in which a fluid is stored;
a hydraulic pressure supply device configured to generate a hydraulic pressure by operating a hydraulic piston in response to a signal from a pedal displacement sensor detecting a displacement of a brake pedal;
a hydraulic control unit comprising a first hydraulic unit configured to control the hydraulic pressure to be transferred from the hydraulic pressure supply device to a first hydraulic circuit comprising two wheel cylinders, and a second hydraulic unit configured to control the hydraulic pressure to be transferred from the hydraulic pressure supply device to a second hydraulic circuit comprising other two wheel cylinders;
a master cylinder provided with at least one chamber and piston to pressurize and discharge the fluid, configured to provide a pedal feel in connection with the brake pedal, and connected to the first hydraulic circuit and the second hydraulic circuit; and
an electronic control unit configured to control the hydraulic pressure supply device and valves,
wherein the electronic control unit comprises:
a first electronic control unit configured to control the first hydraulic unit; and a second electronic control unit configured to be operated separately from the first electronic control unit and to control the second hydraulic unit,
wherein
the master cylinder comprises
a simulation chamber, a simulation piston connected to the brake pedal and provided in the simulation chamber, a master chamber, a master piston provided in the master chamber to be displaceable by a displacement of the simulation piston or a hydraulic pressure of the simulation chamber, and an elastic member provided between the simulation piston and the master piston, and
wherein the electronic brake system further comprises:
a reservoir flow path provided to communicate the master cylinder and the reservoir;
a first backup flow path provided to connect the simulation chamber and the first hydraulic circuit; and
a second backup flow path provided to connect the master chamber and the second hydraulic circuit.

2. The electronic brake system according to claim 1, further comprises:
a first cut valve controlled by the first electronic control unit and provided in the first backup flow path to control a flow of the fluid; and
a second cut valve controlled by the second electronic control unit and provided in the second backup flow path to control a flow of the fluid.

3. The electronic brake system according to claim 2, wherein the reservoir flow path comprises
a simulation flow path provided to communicate the simulation chamber and the reservoir, and a simulator valve provided in the simulation flow path to control flows of the fluid in both directions and controlled by the first electronic control unit.

4. The electronic brake system according to claim 1, wherein
the hydraulic pressure supply device comprises
a first pressure chamber formed on one side of the hydraulic piston and a second pressure chamber formed on the other side of the hydraulic piston, and
wherein the hydraulic control unit comprises
a first hydraulic flow path provided to communicate with the first pressure chamber, a second hydraulic flow path and a third hydraulic flow path provided to be branched from the first hydraulic flow path, a fourth hydraulic flow path provided to communicate with the second pressure chamber, a fifth hydraulic flow path and a sixth hydraulic flow path provided to be branched from the fourth hydraulic flow path, a seventh hydraulic flow path in which the third hydraulic flow path and the sixth hydraulic flow path join, an eighth hydraulic flow path and a ninth hydraulic flow path provided to be branched from the seventh hydraulic flow path, a tenth hydraulic flow path in which the eighth hydraulic flow path and the fifth hydraulic flow path join and connected to the first hydraulic circuit, an eleventh hydraulic flow path in which the ninth hydraulic flow path and the second hydraulic flow path join and connected to the second hydraulic circuit, and a twelfth hydraulic flow path provided to connect the second hydraulic flow path and the fifth hydraulic flow path.

5. The electronic brake system according to claim 4, wherein
the first hydraulic unit comprises
a first valve provided at a front end of the fifth hydraulic flow path to control a flow of the fluid, a second valve provided at a rear end of the fifth hydraulic flow path to control a flow of the fluid, a third valve provided in the sixth hydraulic flow path to control a flow of the fluid, and a fourth valve provided in the eighth hydraulic flow path to control a flow of the fluid, and
wherein the second hydraulic unit comprises
a fifth valve provided at a front end of the second hydraulic flow path to control a flow of the fluid, a sixth valve provided at a rear end of the second hydraulic flow path to control a flow of the fluid, a seventh valve provided in the third hydraulic flow path to control a flow of the fluid, and an eighth valve provided in the ninth hydraulic flow path to control a flow of the fluid.

6. The electronic brake system according to claim 5, wherein
the first valve is provided as a check valve that allows only a flow of the fluid from the second pressure chamber toward the rear end of the fifth hydraulic flow path or the twelfth hydraulic flow path, the fourth valve is provided as a check valve that allows only a flow of the fluid from the first hydraulic circuit toward the seventh hydraulic flow path, the fifth valve is provided as a check valve that allows only a flow of the fluid from the first pressure chamber toward the rear end of the second hydraulic flow path or the twelfth hydraulic flow path, the eighth valve is provided as a check valve that allows only a flow of the fluid from the second hydraulic circuit toward the seventh hydraulic flow path, and the second valve, the third valve, the sixth valve, and the seventh valve are provided as solenoid valves that control flows of the fluid in both directions.

7. The electronic brake system according to claim 1, wherein
the hydraulic pressure supply device comprises
a first pressure chamber formed on one side of the hydraulic piston and a second pressure chamber formed on the other side of the hydraulic piston, and
wherein the electronic brake system further comprises:
a first dump flow path provided to connect the first pressure chamber and the reservoir;
a second dump flow path connecting the second pressure chamber and the reservoir;
a first dump valve controlled by the second electronic control unit and provided in the first dump flow path to control flows of the fluid in both directions; and
a second dump valve controlled by the first electronic control unit and provided in the second dump flow path to control flows of the fluid in both directions.

8. The electronic brake system according to claim 1, wherein
the first hydraulic unit comprises
a first inlet valve and a second inlet valve provided to control flows of the fluid supplied to the first hydraulic circuit, respectively, and
wherein the second hydraulic unit comprises
a third inlet valve and a fourth inlet valve provided to control flows of the fluid supplied to the second hydraulic circuit, respectively, and a first outlet valve and a second outlet valve provided to control flows of the fluid discharged from the second hydraulic circuit to the reservoir, respectively.

9. An operation method of the electronic brake system according to claim 3, the operation method comprising:
a normal operation mode in which both the first electronic control unit and the second electronic control unit operate normally, a first abnormal operation mode in which both the first electronic control unit and the second electronic control unit operate abnormally, a second abnormal operation mode in which the first electronic control unit operates normally and the second electronic control unit operates abnormally, and a third abnormal operation mode in which the first electronic control unit operates abnormally and the second electronic control unit operates normally.

10. The operation method according to claim 9, wherein in the normal operation mode,
the master chamber is sealed by closing the first cut valve and the second cut valve, the simulation chamber and the reservoir communicate with each other by opening the simulator valve, and the simulation piston compresses the elastic member by an operation of the brake pedal so that an elastic restoring force of the elastic member is provided to a driver as a pedal feeling, and
wherein the hydraulic pressure supply device provides the hydraulic pressure to the first hydraulic circuit and the second hydraulic circuit by an operation of the hydraulic piston.

11. The operation method according to claim 9, wherein in the first abnormal operation mode,
the simulation chamber and the first hydraulic circuit communicate with each other by opening the first cut valve, and the master chamber and the second hydraulic circuit communicate with each other by opening the second cut valve, and
wherein the fluid in the simulation chamber is provided to the first hydraulic circuit through the first backup flow path by a pressing force of the brake pedal, and the fluid in the master chamber is provided to the second hydraulic circuit through the second backup flow path by the pressing force of the brake pedal.

12. The operation method according to claim 9, wherein in the second abnormal operation mode, the simulation chamber and the reservoir communicate with each other by opening the simulator valve, the first backup flow path is blocked by closing the first cut valve, and the master chamber and the second hydraulic circuit communicate with each other by opening the second cut valve, wherein the simulation piston compresses the elastic member by an operation of the brake pedal so that an elastic restoring force of the elastic member is provided to a driver as a pedal feeling, and the fluid in the master chamber is provided to the second hydraulic circuit through the second backup flow path by a forward movement of the master piston, and wherein the hydraulic pressure supply device provides the hydraulic pressure to the first hydraulic circuit through the first hydraulic unit controlled by the first electronic control unit.

13. The operation method according to claim 9, wherein in the third abnormal operation mode, the simulation flow path is blocked by closing the simulator valve, the simulation chamber and the first hydraulic circuit communicate with each other by opening the first cut valve, and the second backup flow path is blocked by closing the second cut valve, wherein the fluid in the simulation chamber is provided to the first hydraulic circuit through the first backup flow path by an operation of the brake pedal, and wherein the hydraulic pressure supply device provides the hydraulic pressure to the second hydraulic circuit through the second hydraulic unit controlled by the second electronic control unit.

14. The electronic brake system according to claim 1, wherein the master cylinder further comprises an other master chamber, an other master piston provided in the other master chamber to be displaceable by a displacement of the master piston or a hydraulic pressure of the master chamber, and an elastic member provided between the simulation piston and the master piston, and wherein the electronic brake system further comprises:

a reservoir flow path provided to communicate the master cylinder and the reservoir communicate;

a first backup flow path provided to connect the simulation chamber and the other master chamber to the first hydraulic circuit; and a second backup flow path provided to connect the master chamber and the second hydraulic circuit.

15. The electronic brake system according to claim 14, further comprising:

a first cut valve controlled by the first electronic control unit and provided in the first backup flow path to control a flow of the fluid; and a second cut valve controlled by the second electronic control unit and provided in the second backup flow path to control a flow of the fluid.

16. The electronic brake system according to claim 15, wherein the reservoir flow path comprises a simulation flow path provided to communicate the simulation chamber and the reservoir, and a simulator valve provided in the simulation flow path to control a flow of the fluid and controlled by the first electronic control unit.

17. An electronic brake system comprising:

a simulator configured to provide a reaction force corresponding to a pressing force of a brake pedal;

a hydraulic pressure supply device configured to generate a hydraulic pressure by operating a hydraulic piston in response to a signal from a pedal displacement sensor detecting a displacement of the brake pedal and comprising a first pressure chamber formed on one side of the hydraulic piston and a second pressure chamber formed on the other side of the hydraulic piston;

a hydraulic control unit comprising a first hydraulic unit configured to control the hydraulic pressure to be transferred from the hydraulic pressure supply device to a first hydraulic circuit comprising two wheel cylinders, and a second hydraulic unit configured to control the hydraulic pressure to be transferred from the hydraulic pressure supply device to a second hydraulic circuit comprising other two wheel cylinders; and an electronic control unit comprising a first electronic control unit configured to control the hydraulic pressure supply device and the first hydraulic unit, and a second electronic control unit configured to be operated separately from the first electronic control unit and to control the hydraulic pressure supply device and the second hydraulic unit, wherein the hydraulic control unit comprises a first hydraulic flow path provided to communicate with the first pressure chamber, a second hydraulic flow path and a third hydraulic flow path provided to be branched from the first hydraulic flow path, a fourth hydraulic flow path provided to communicate with the second pressure chamber, a fifth hydraulic flow path and a sixth hydraulic flow path provided to be branched from the fourth hydraulic flow path, a seventh hydraulic flow path in which the third hydraulic flow path and the sixth hydraulic flow path join, an eighth hydraulic flow path and a ninth hydraulic flow path provided to be branched from the seventh hydraulic flow path, a tenth hydraulic flow path in which the eighth hydraulic flow path and the fifth hydraulic flow path join and connected to the first hydraulic circuit, an eleventh hydraulic flow path in which the ninth hydraulic flow path and the second hydraulic flow path join and connected to the second hydraulic circuit, and a twelfth hydraulic flow path provided to connect the second hydraulic flow path and the fifth hydraulic flow path, and wherein the simulator is provided to be hydraulically separated from the hydraulic control unit, the first hydraulic circuit, and the second hydraulic circuit.

18. The electronic brake system according to claim 17, wherein the first hydraulic unit comprises a first valve provided at a front end of the fifth hydraulic flow path to control a flow of the fluid, a second valve provided at a rear end of the fifth hydraulic flow path to control a flow of the fluid, a third valve provided in the sixth hydraulic flow path to control a flow of the fluid, and a fourth valve provided in the eighth hydraulic flow path to control a flow of the fluid, and wherein the second hydraulic unit comprises a fifth valve provided at a front end of the second hydraulic flow path to control a flow of the fluid, a sixth valve provided at a rear end of the second hydraulic flow path to control a flow of the fluid, a seventh valve provided in the third hydraulic flow path to control a flow of the fluid, and an eighth valve provided in the ninth hydraulic flow path to control a flow of the fluid.

19. The electronic brake system according to claim 18, wherein the first valve is provided as a check valve that allows only a flow of the fluid from the second pressure chamber toward the rear end of the fifth hydraulic flow path or the twelfth hydraulic flow path, the fourth valve is provided as a check valve that allows only a flow of the fluid from the first hydraulic circuit toward the seventh hydraulic flow path, the fifth valve is provided as a check valve that allows only a flow of the fluid from the first pressure chamber toward the rear end of the second hydraulic flow path or the twelfth hydraulic flow path, the eighth valve is provided as a check valve that allows only a flow of the fluid from the second hydraulic circuit toward the seventh hydraulic flow path, and the second valve, the third valve, the sixth valve, and the seventh valve are provided as solenoid valves that control flows of the fluid in both directions.

\* \* \* \* \*